(12) United States Patent
Nonaka et al.

(10) Patent No.: US 9,824,806 B2
(45) Date of Patent: Nov. 21, 2017

(54) COIL, ROTATING ELECTRICAL MACHINE, AND METHOD OF MANUFACTURING COIL

(71) Applicant: KABUSHIKI KAISHA YASKAWA DENKI, Kitakyushu-shi (JP)

(72) Inventors: Tsuyoshi Nonaka, Kitakyushu (JP); Masayuki Hirayama, Kitakyushu (JP); Haruki Yahara, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 99 days.

(21) Appl. No.: 14/598,230

(22) Filed: Jan. 16, 2015

(65) Prior Publication Data
US 2015/0123509 A1    May 7, 2015

Related U.S. Application Data

(63) Continuation of application No. PCT/JP2013/050069, filed on Jan. 8, 2013.

(30) Foreign Application Priority Data

Aug. 21, 2012    (JP) .................... PCT/JP2012/071105

(51) Int. Cl.
*H01F 27/02*    (2006.01)
*H01F 5/06*    (2006.01)
*H02K 1/14*    (2006.01)
*H02K 3/32*    (2006.01)
*H02K 3/52*    (2006.01)
*H02K 15/04*    (2006.01)
(Continued)

(52) U.S. Cl.
CPC ............... *H01F 5/06* (2013.01); *H01F 27/02* (2013.01); *H01F 27/022* (2013.01); *H01F 27/327* (2013.01); *H01F 41/071* (2016.01); *H01F 41/127* (2013.01); *H02K 1/148* (2013.01); *H02K 3/32* (2013.01); *H02K 3/325* (2013.01); *H02K 3/522* (2013.01); *H02K 15/045* (2013.01); *H02K 15/0435* (2013.01)

(58) Field of Classification Search
CPC .......................................... H01F 27/00–27/30
USPC ......................... 336/65, 90, 92, 96, 220–223
See application file for complete search history.

(56) References Cited

U.S. PATENT DOCUMENTS

| | | | |
|---|---|---|---|
| 2004/0140731 A1* | 7/2004 | Kometani | .............. H02K 1/243 310/263 |
| 2008/0170952 A1 | 7/2008 | Jung | |

(Continued)

FOREIGN PATENT DOCUMENTS

| | | |
|---|---|---|
| CN | 101225811 | 7/2008 |
| CN | 102570655 | 7/2012 |

(Continued)

OTHER PUBLICATIONS

The International Preliminary Report on Patentability (Chapter I) with translation of Written Opinion of the International Searching Authority for corresponding International Application No. PCT/JP2013/050069, dated Mar. 5, 2015.

(Continued)

*Primary Examiner* — Tuyen Nguyen
(74) *Attorney, Agent, or Firm* — Mori & Ward, LLP

(57) ABSTRACT

A coil includes a wound body and a resin covering. The wound body is configured by winding a conductor. The wound body is pressure-molded. The resin covering covers a surface of the wound body.

8 Claims, 17 Drawing Sheets

(51) Int. Cl.
  *H01F 27/32* (2006.01)
  *H01F 41/12* (2006.01)
  *H01F 41/071* (2016.01)

(56) References Cited

U.S. PATENT DOCUMENTS

| | | | |
|---|---|---|---|
| 2009/0322180 A1 | 12/2009 | Nonaka | |
| 2010/0237726 A1* | 9/2010 | Hayakawa | H02K 1/185 310/64 |
| 2012/0146434 A1 | 6/2012 | Nonaka | |
| 2014/0035431 A1* | 2/2014 | Fukase | H01R 39/388 310/227 |
| 2014/0117790 A1* | 5/2014 | Sakamoto | H02K 1/148 310/44 |
| 2015/0187477 A1* | 7/2015 | Makino | H01F 5/00 310/12.22 |

FOREIGN PATENT DOCUMENTS

| EP | 2463990 | | 6/2012 |
|---|---|---|---|
| JP | 55117451 A | * | 9/1980 |
| JP | 57-078252 U | | 5/1982 |
| JP | 64-1445 | | 1/1989 |
| JP | 08-154364 | | 6/1996 |
| JP | 08-205441 | | 8/1996 |
| JP | 2001-054211 | | 2/2001 |
| JP | 2003-304656 | | 10/2003 |
| JP | 2008-199806 | | 8/2008 |
| JP | 2009-153287 | | 7/2009 |
| JP | 2009-254001 | | 10/2009 |
| JP | 2010-081744 | | 4/2010 |
| JP | 2011-103733 | | 5/2011 |
| JP | 2012-125080 | | 6/2012 |
| WO | WO 2008/149649 | | 12/2008 |
| WO | 2011/101986 | | 8/2011 |

OTHER PUBLICATIONS

Japanese Office Action for corresponding JP Application No. 2014-531511, dated Sep. 1, 2015.
Chinese Office Action for corresponding CN Application No. 201380036840.7, dated Jun. 3, 2016.
International Search Report for corresponding International Application No. PCT/JP2013/050069, Apr. 16, 2013.
Chinese Office Action for corresponding CN Application No. 201380036840.7, dated Dec. 29, 2016.
European Office Action for corresponding EP Application No. 13830770.7-1808, dated Aug. 31, 2017.

* cited by examiner

[FIG. 1]
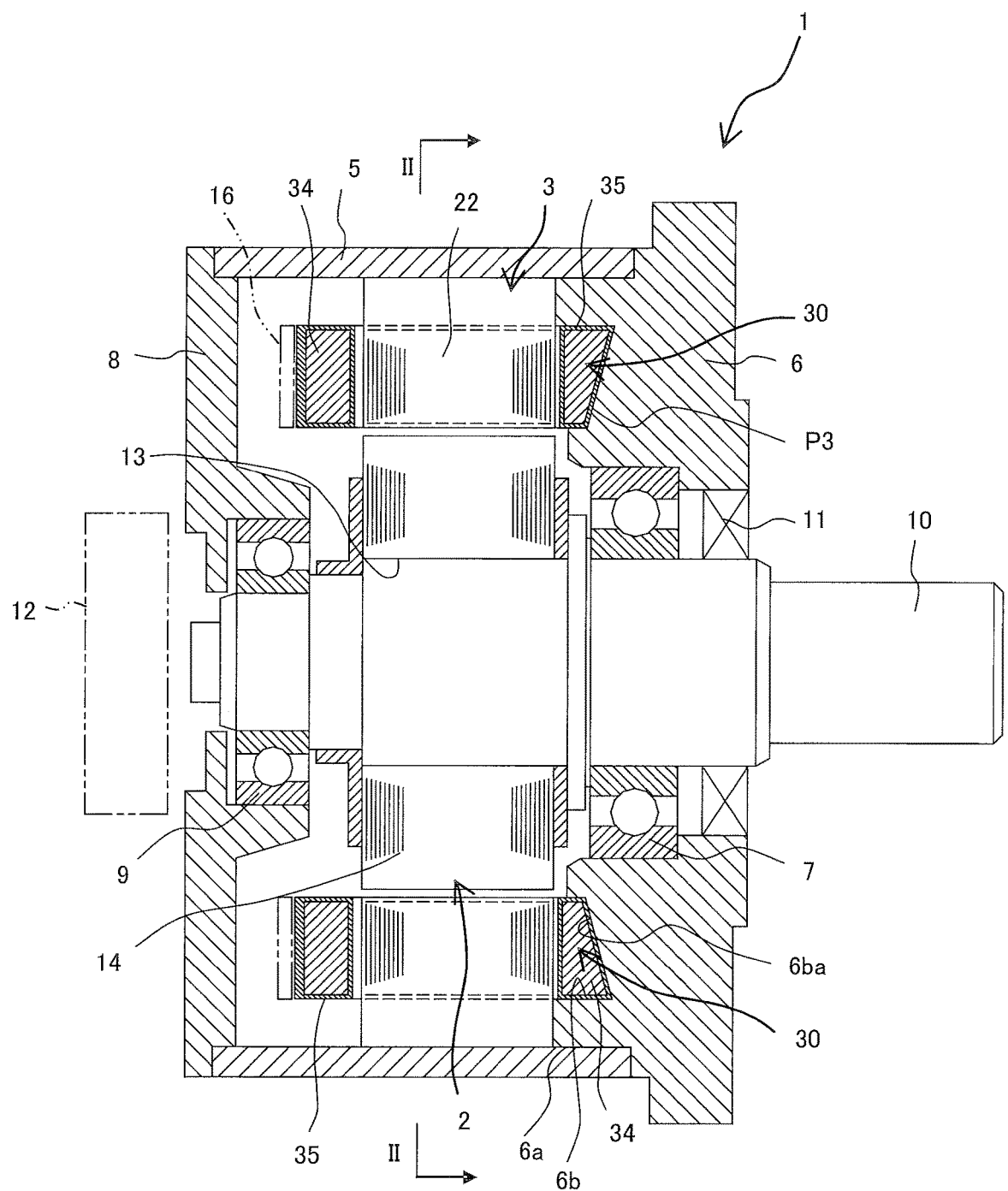

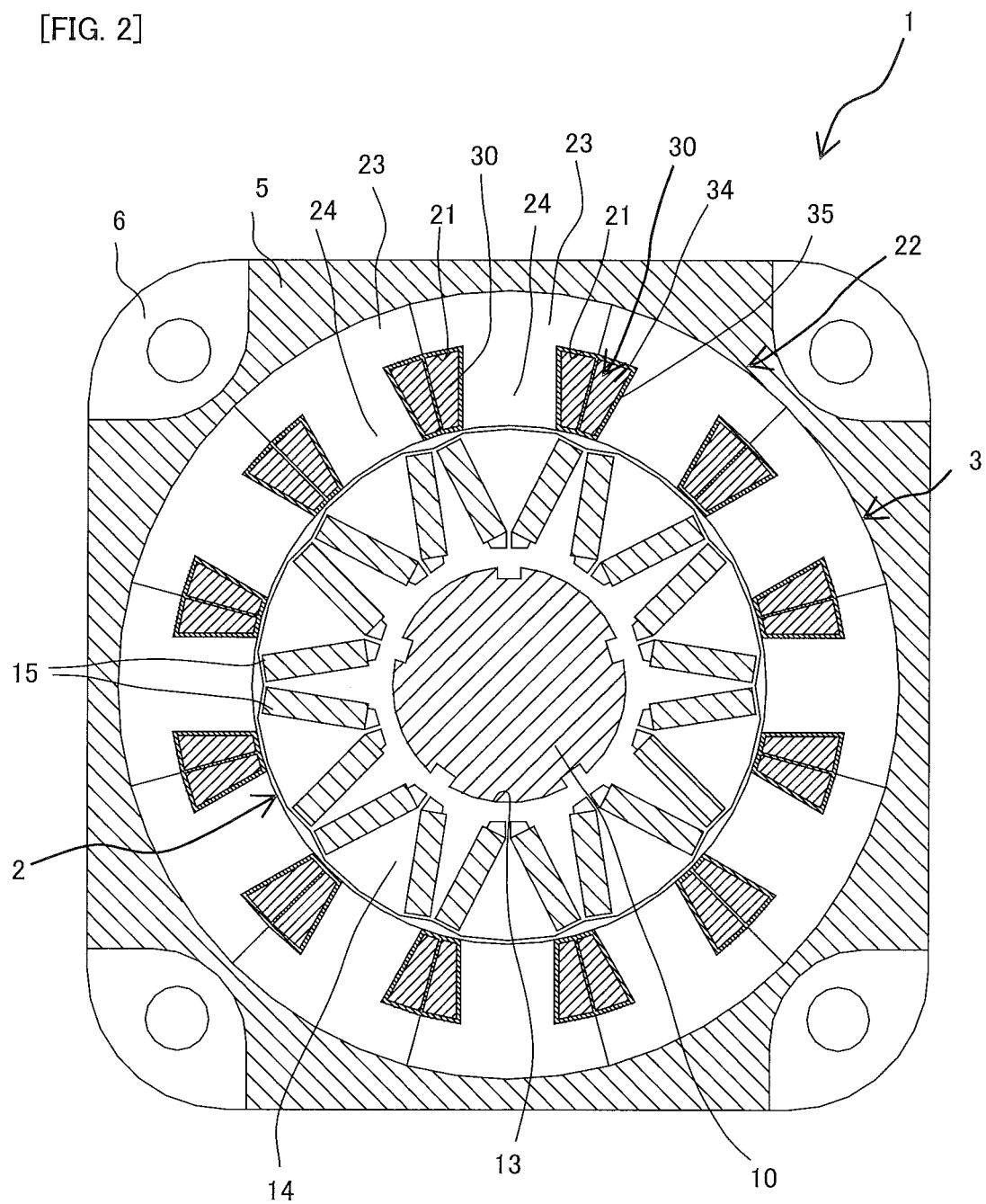
[FIG. 2]

[FIG. 3]
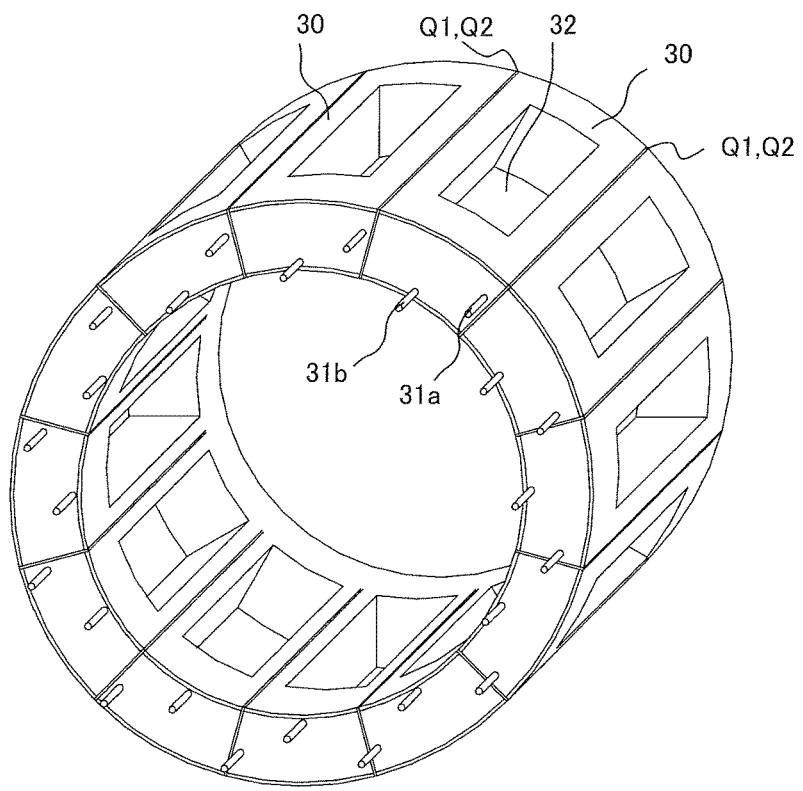
[FIG. 4]
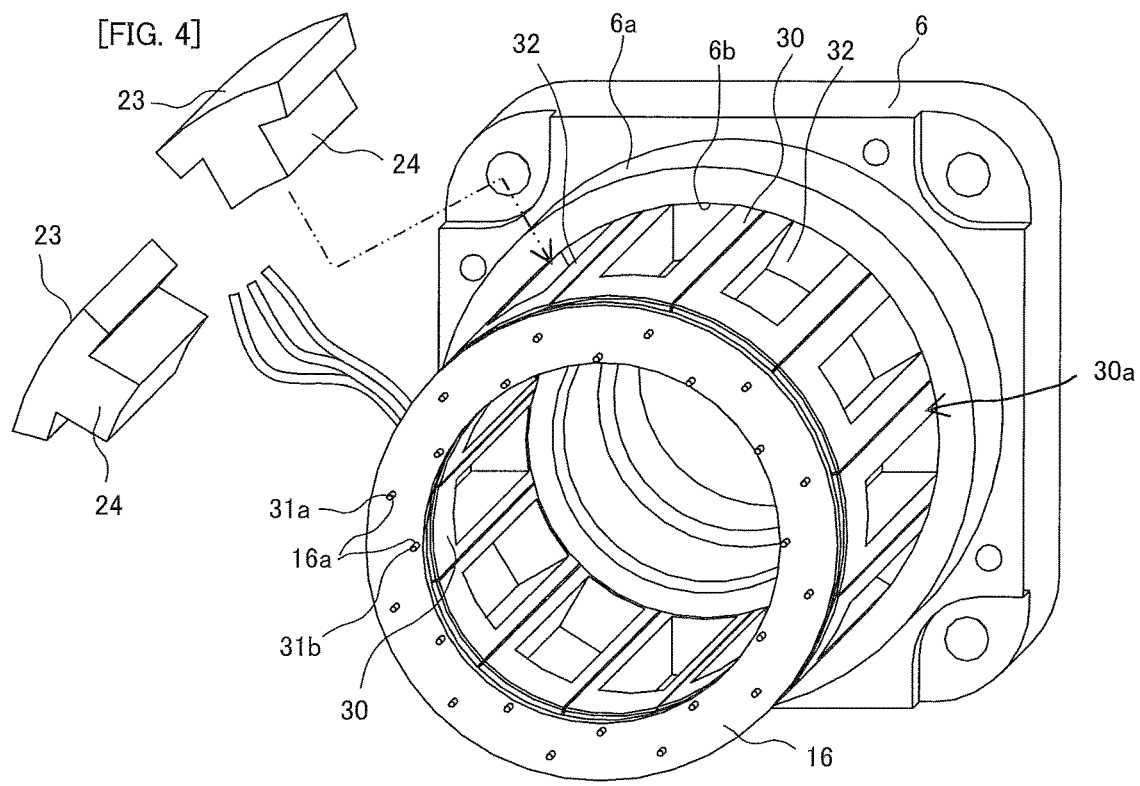

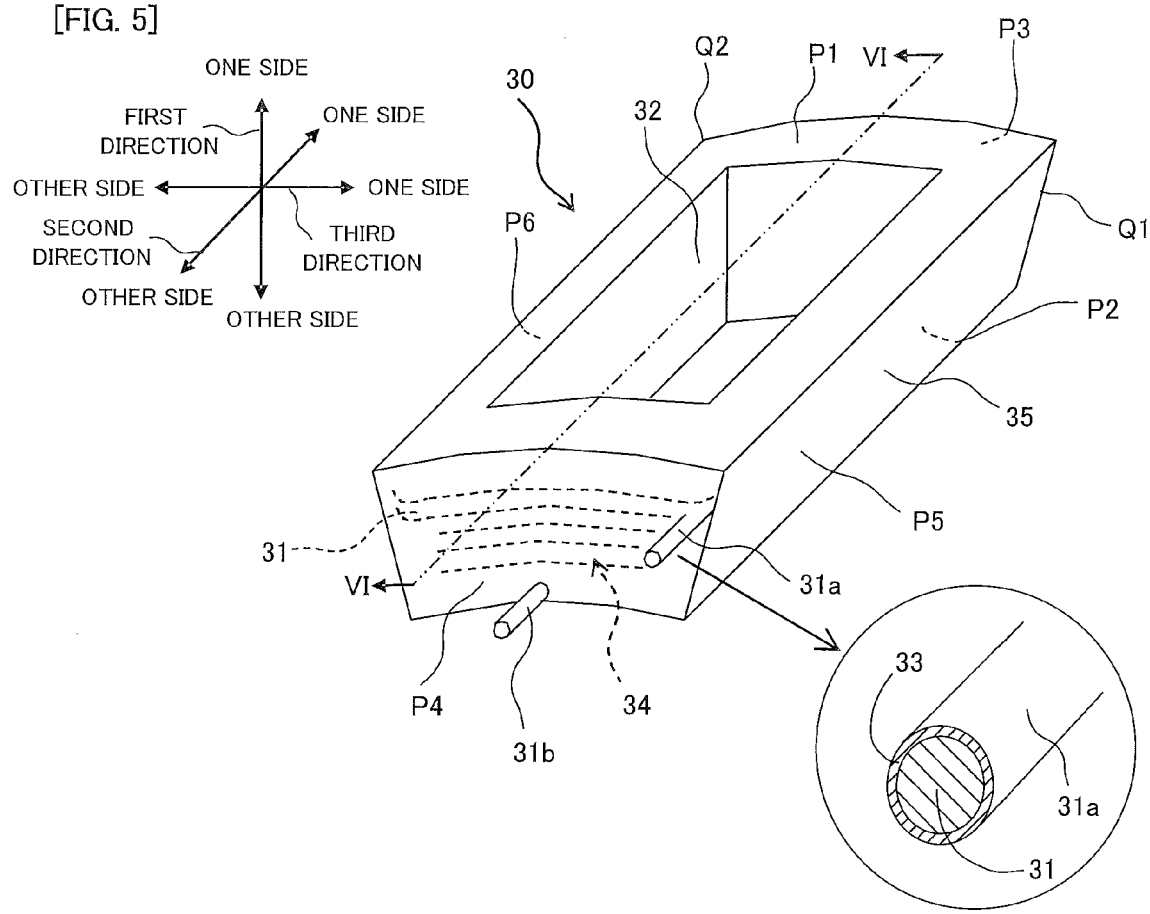
[FIG. 5]
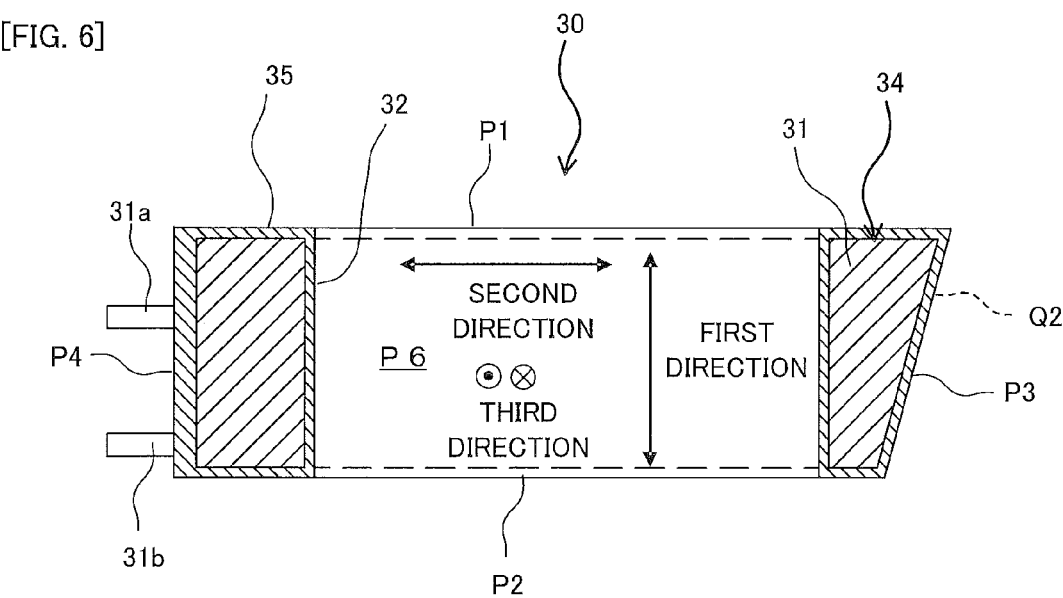
[FIG. 6]

[FIG. 7]
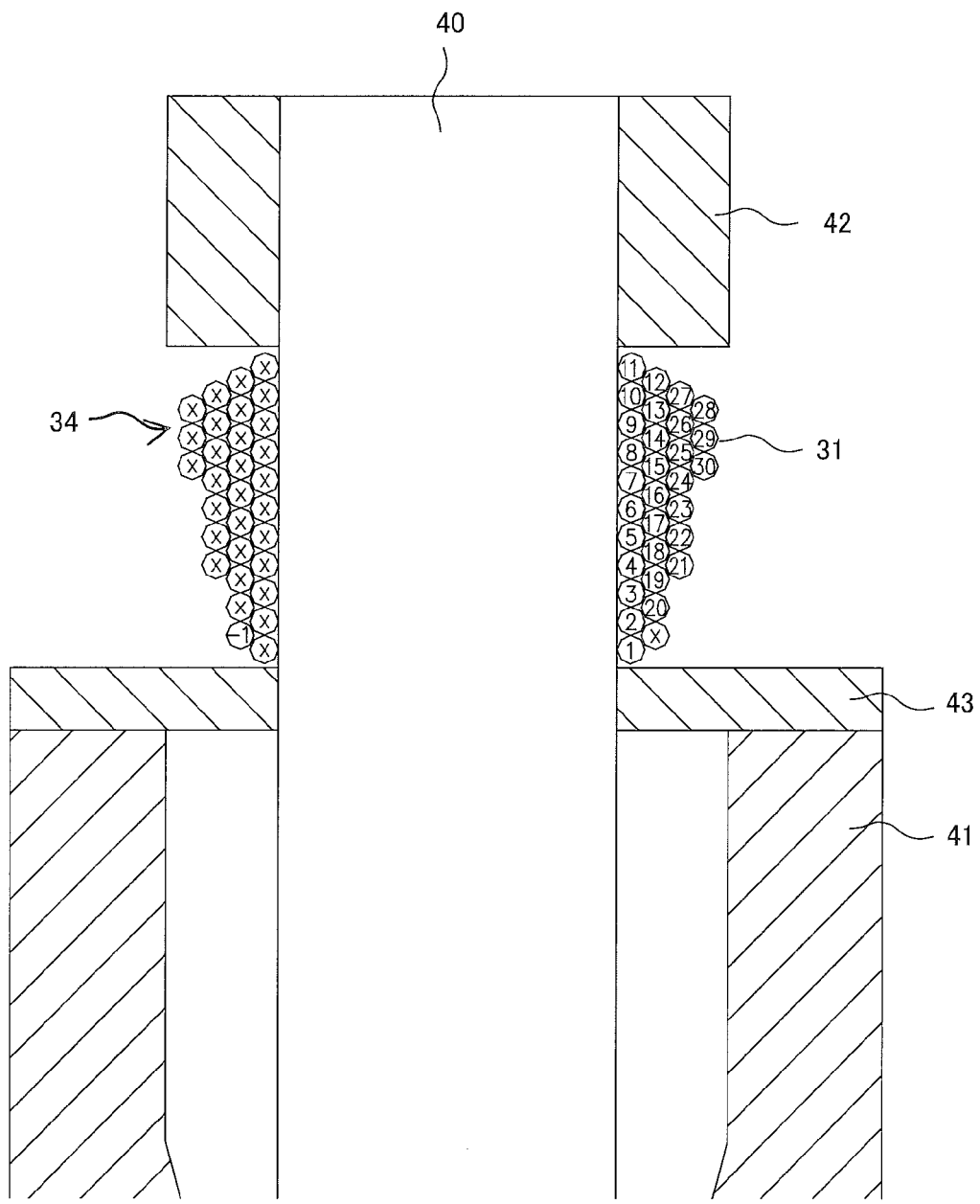

[FIG. 8A]
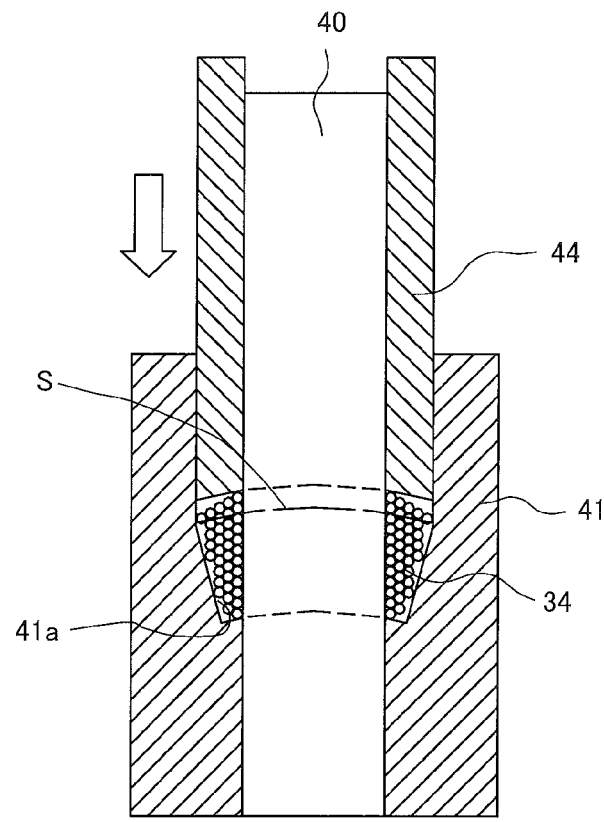
[FIG. 8B]
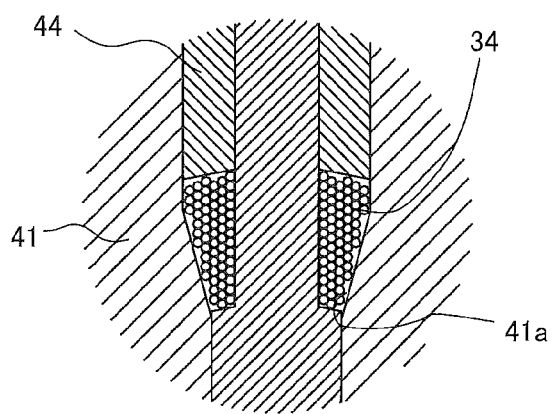
[FIG. 8C]
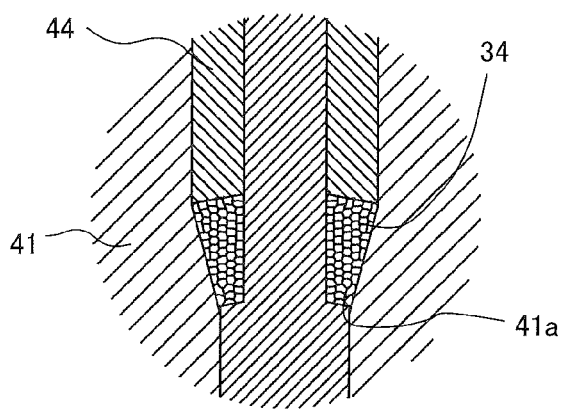

[FIG. 9A]
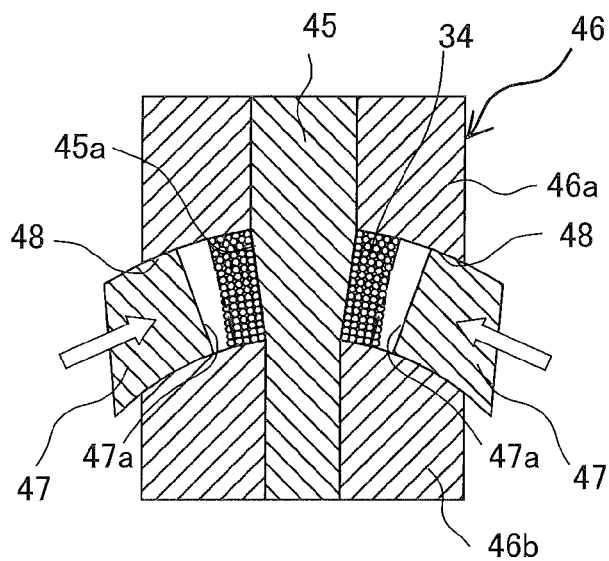
[FIG. 9B]
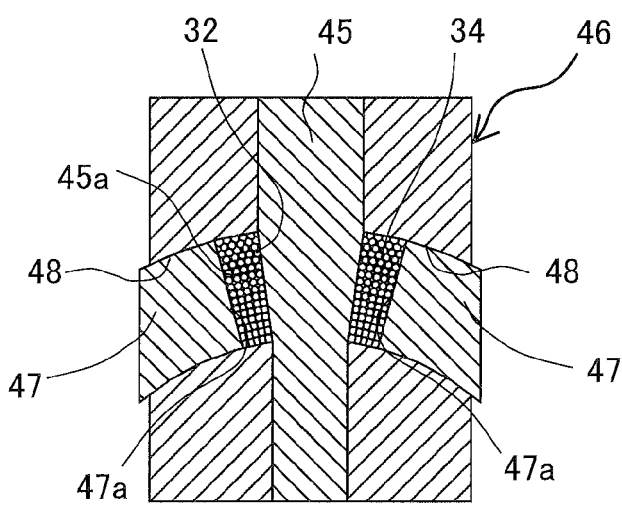
[FIG. 9C]
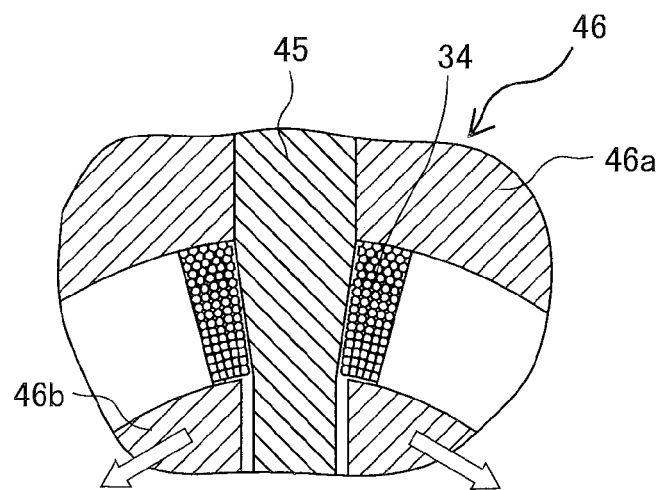

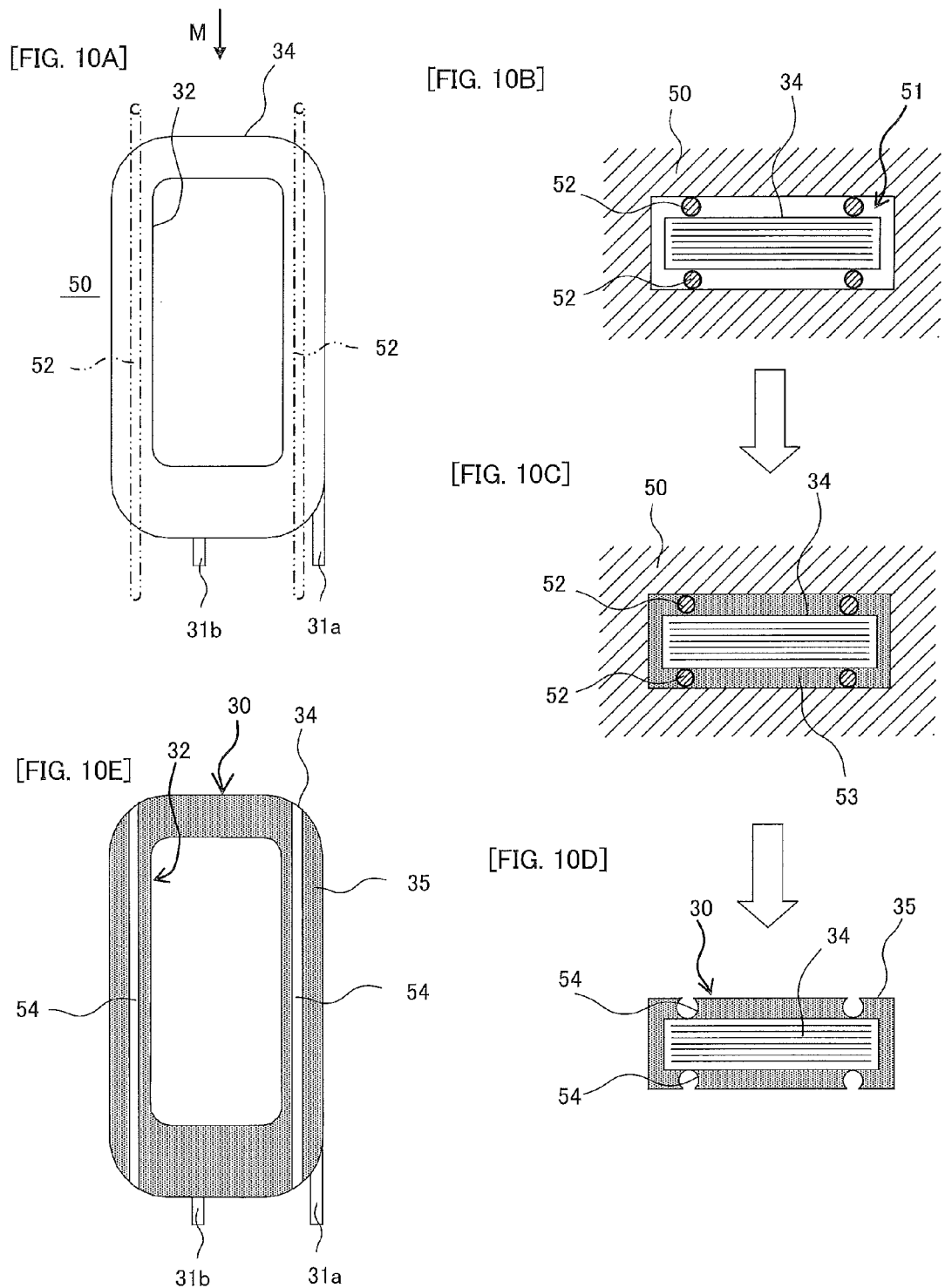

[FIG. 11A]
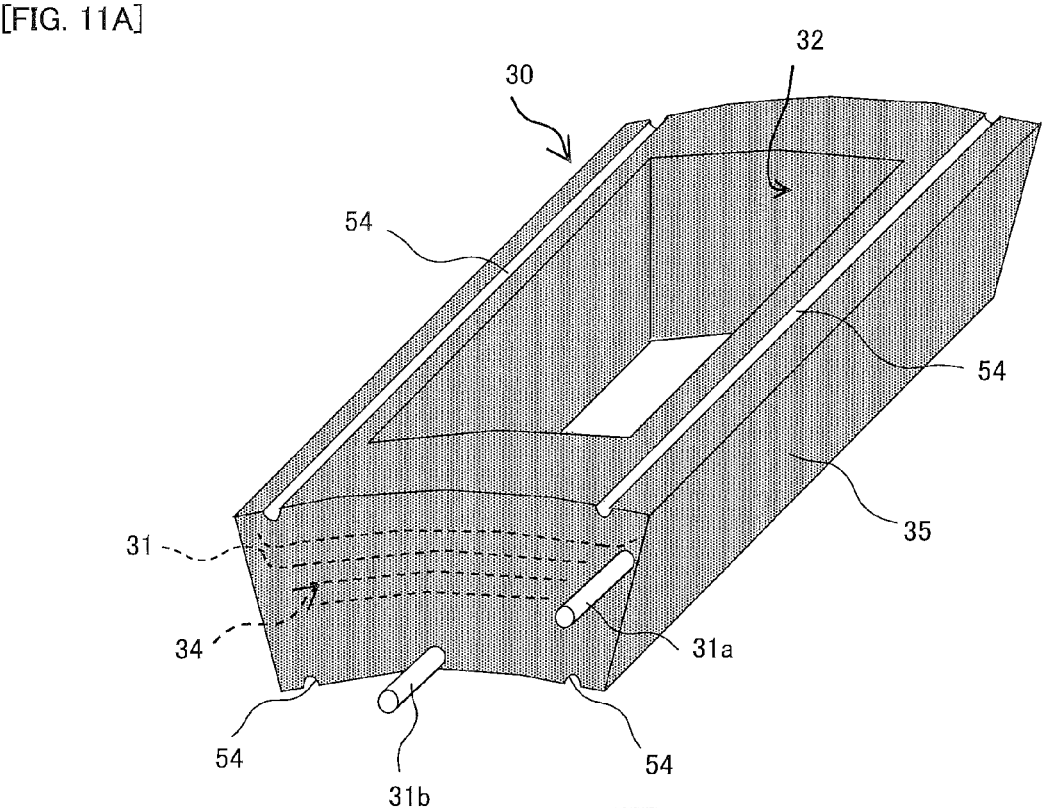
[FIG. 11B]
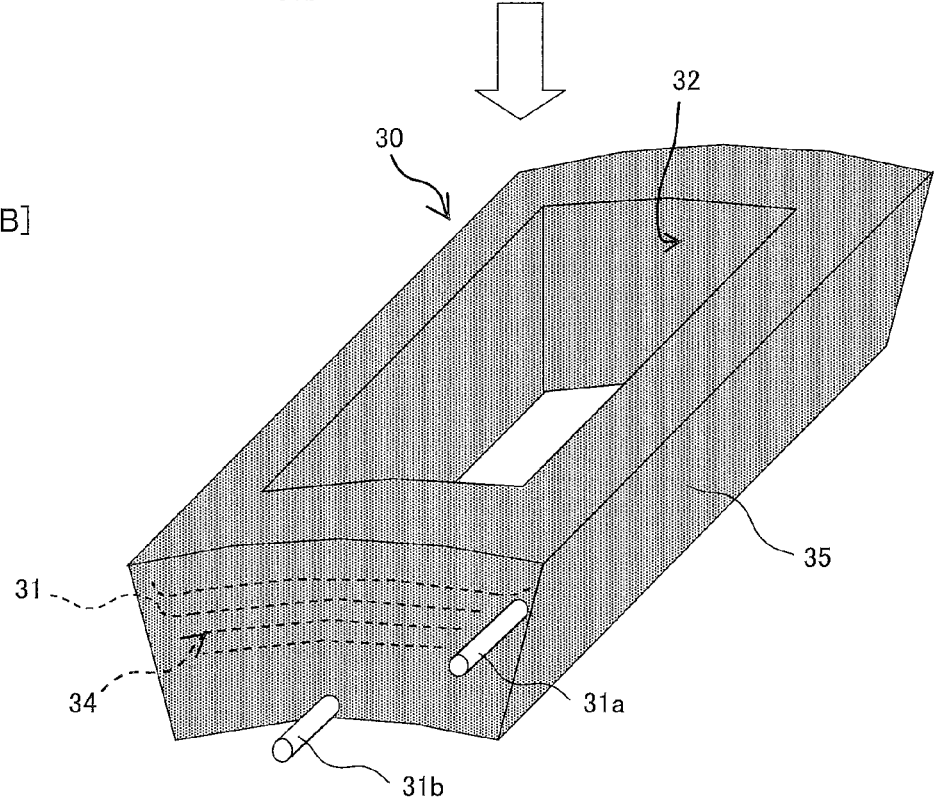

[FIG. 12A]
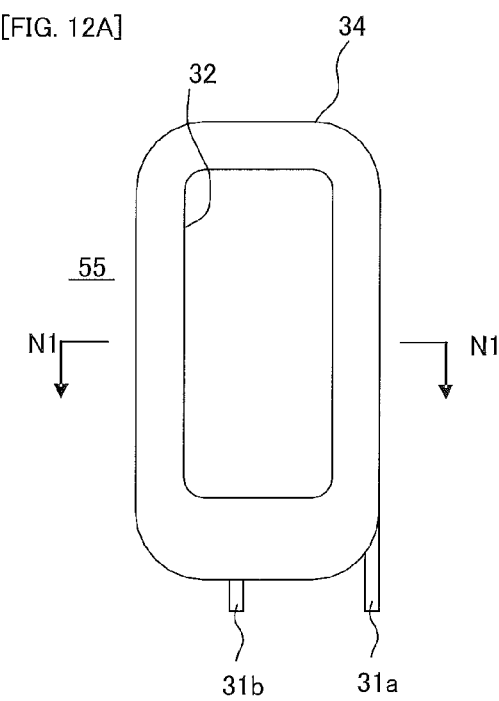
[FIG. 12B]
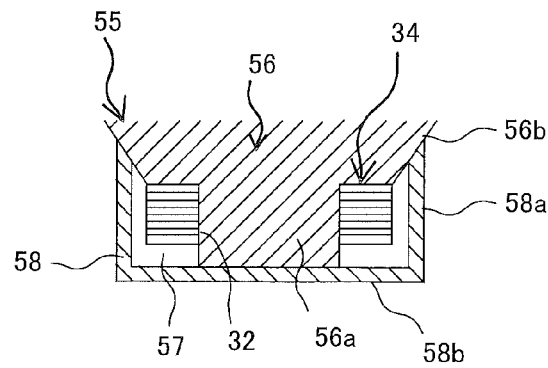
[FIG. 12D]
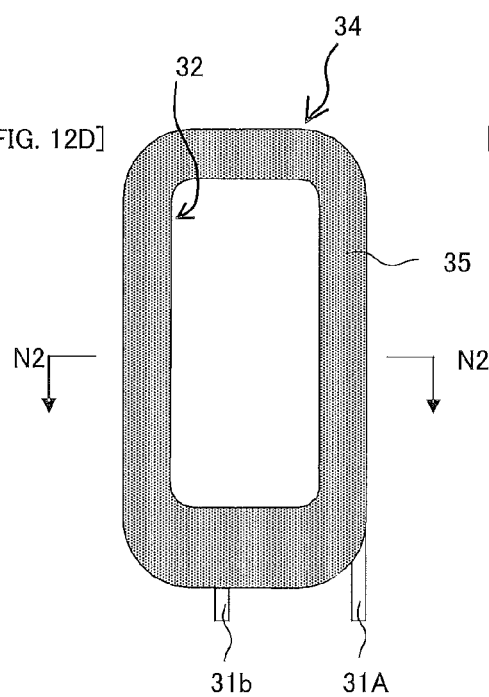
[FIG. 12C]
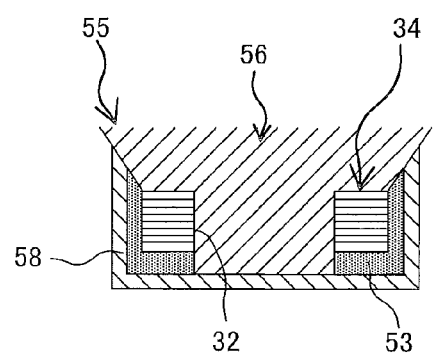

[FIG. 13A]
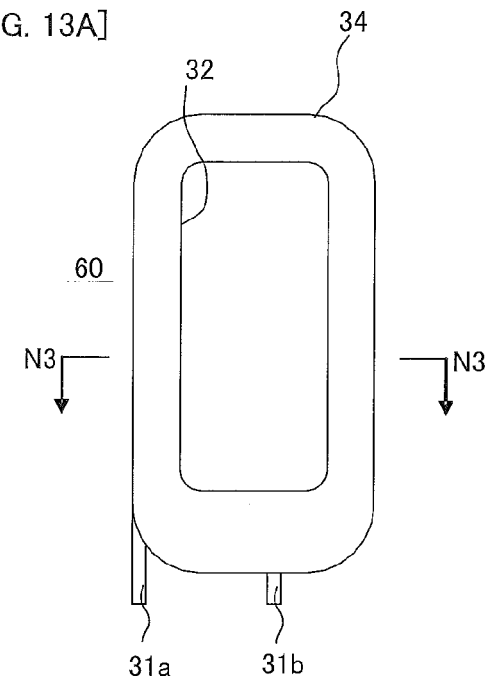
[FIG. 13B]
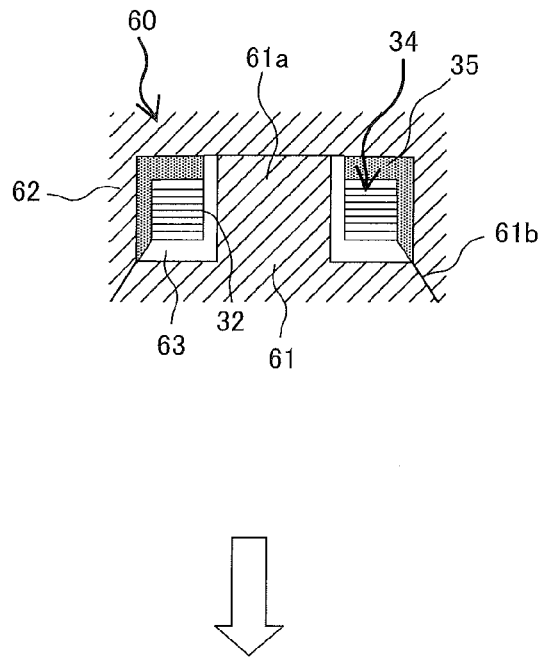
[FIG. 13C]
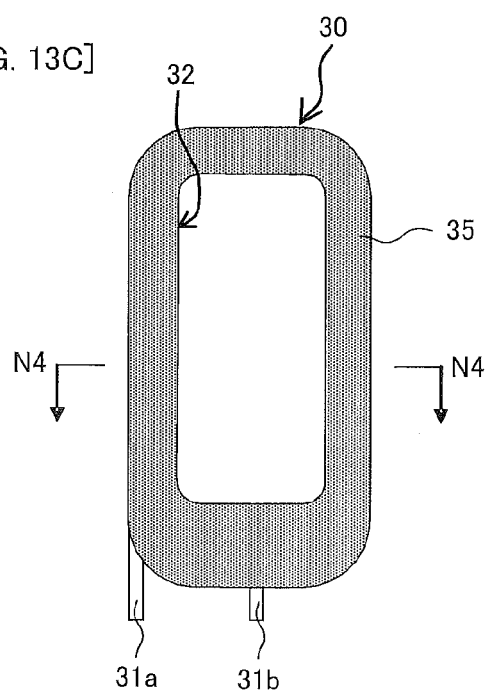
[FIG. 13D]
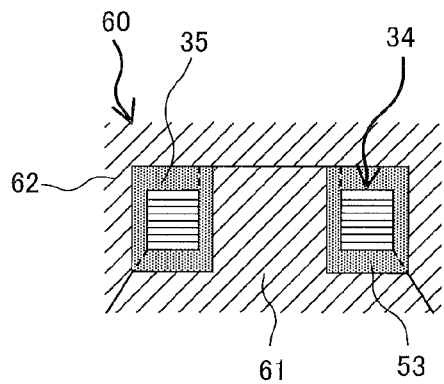

[FIG. 14A]
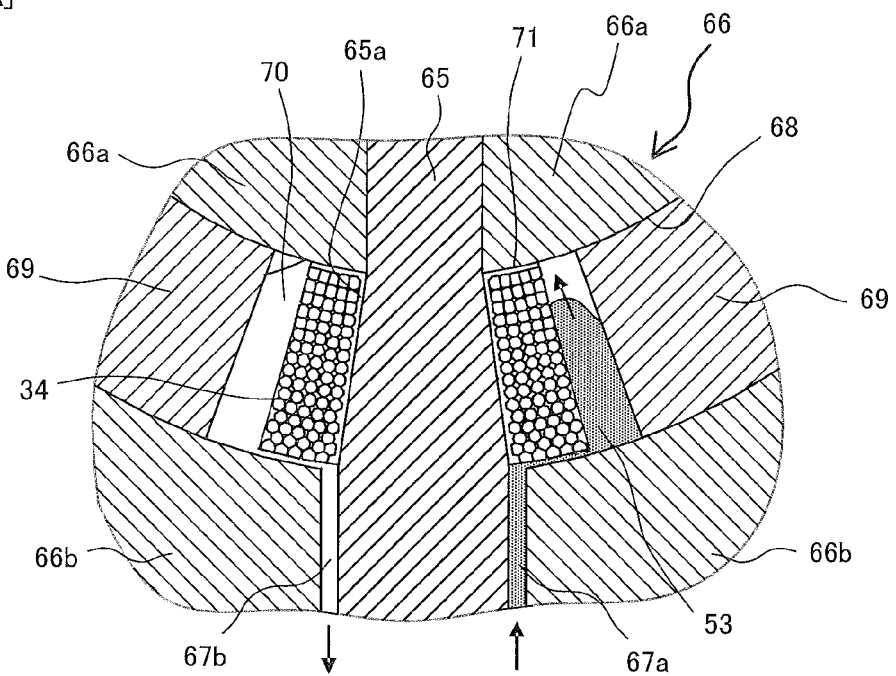
[FIG. 14B]
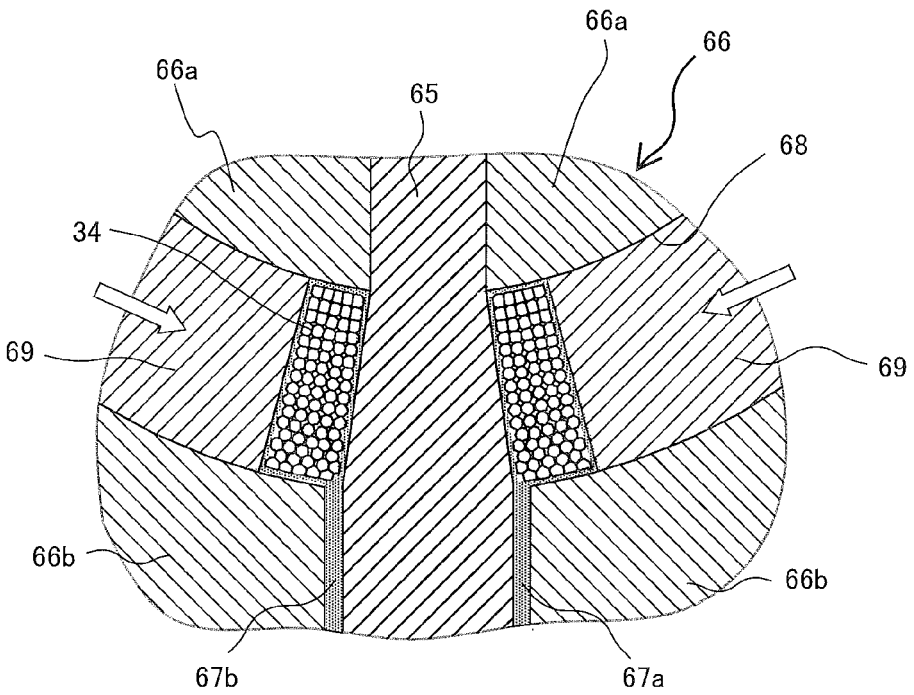

[FIG. 15]
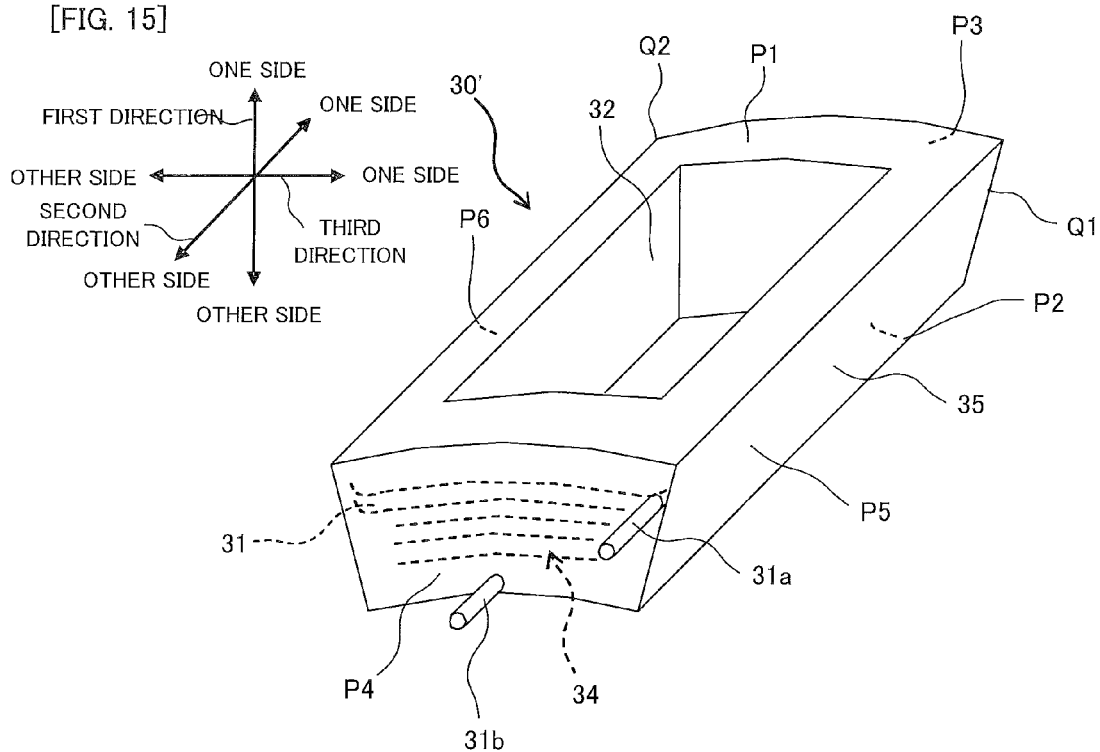
[FIG. 16]
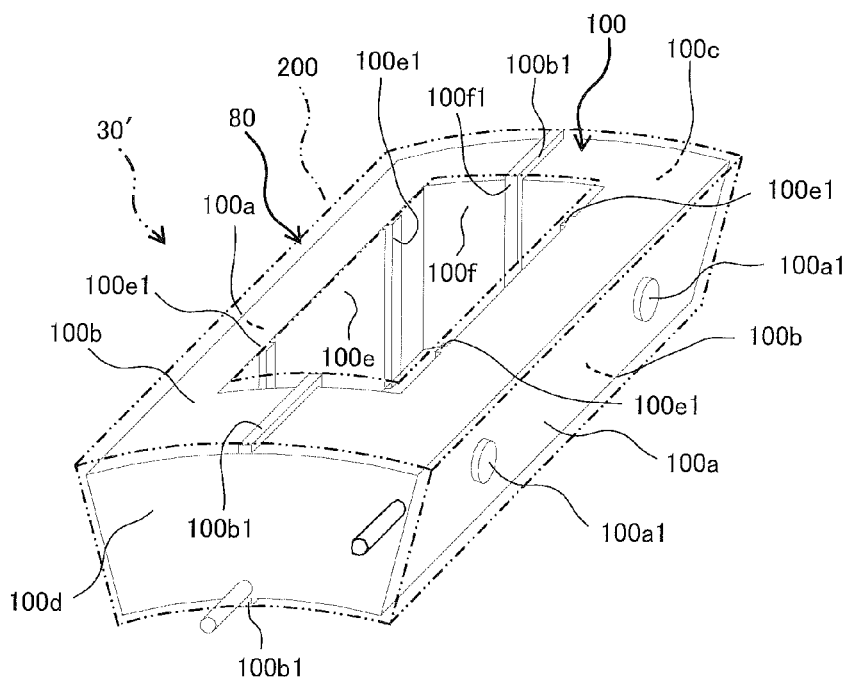

[FIG. 17]
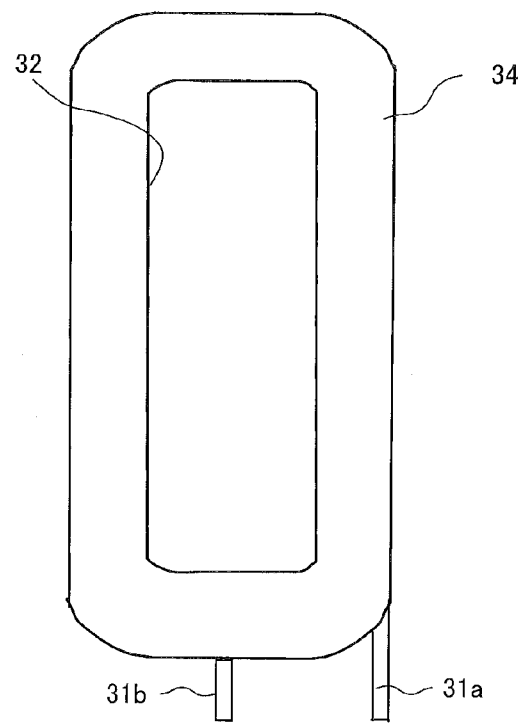
[FIG. 18]
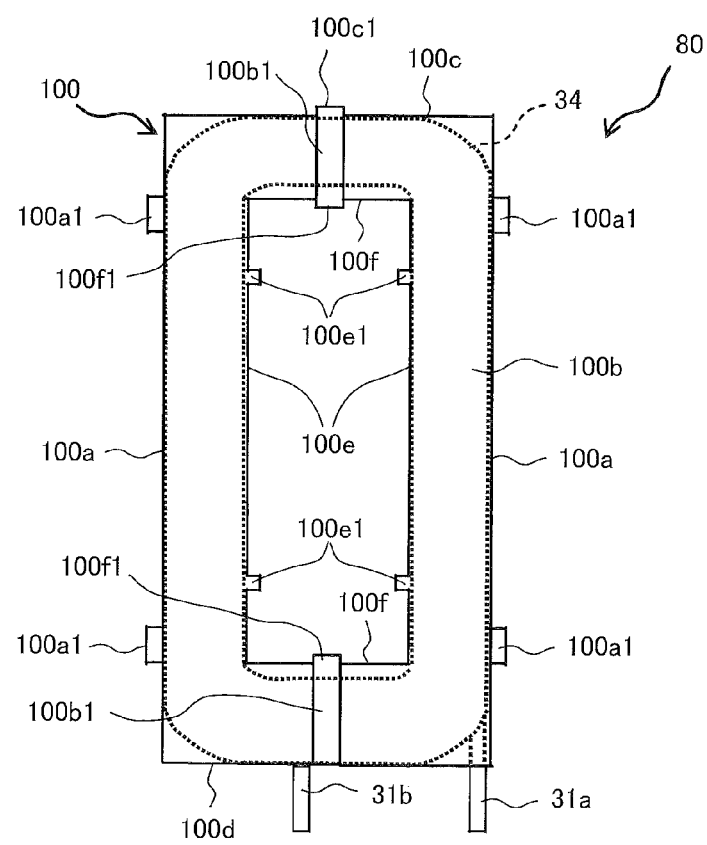

[FIG. 19]
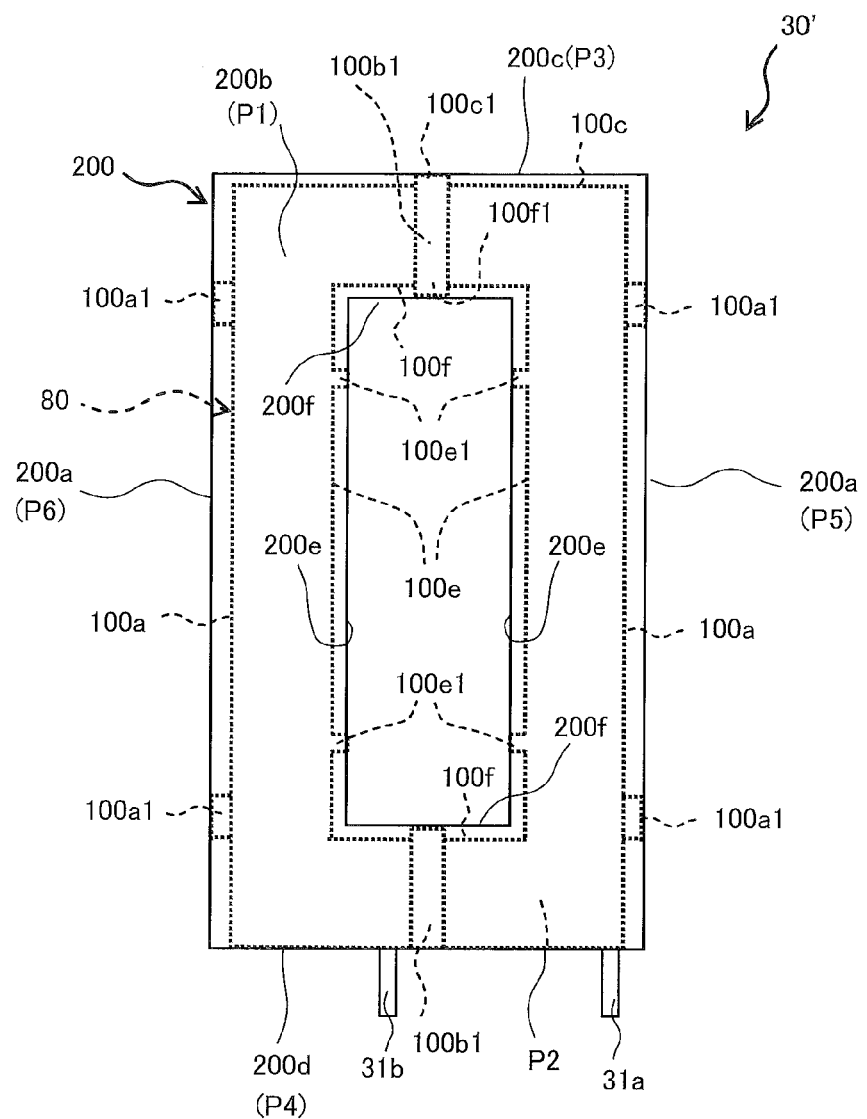

[FIG. 20]
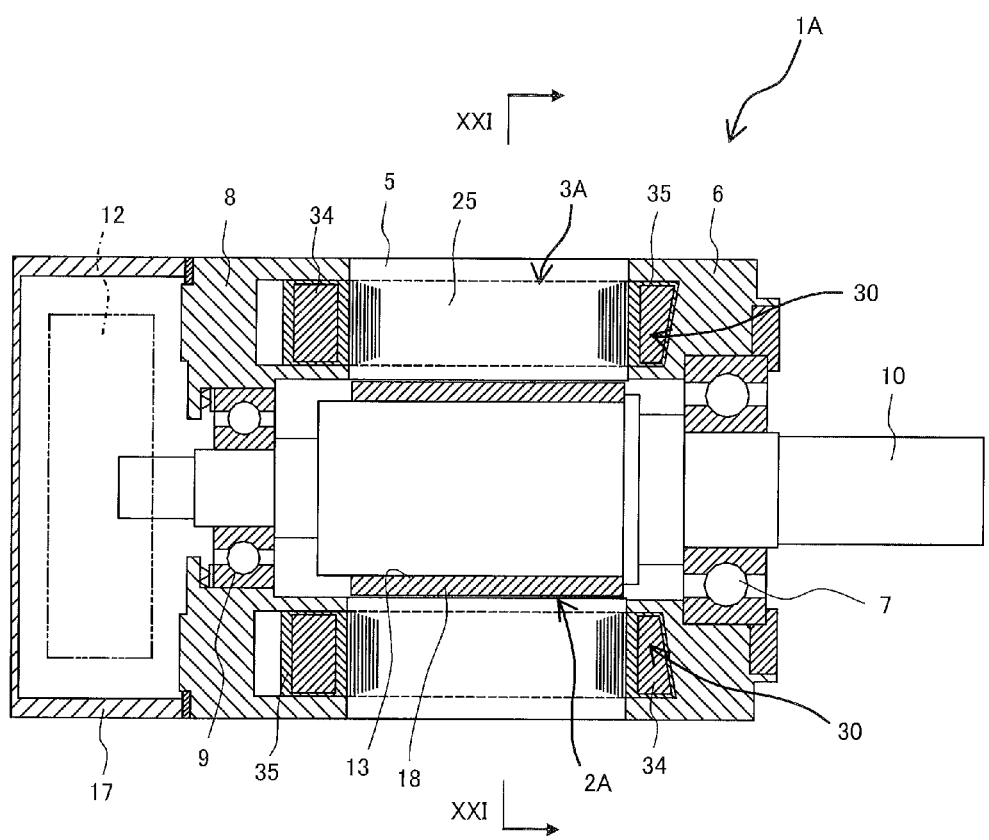

[FIG. 21]
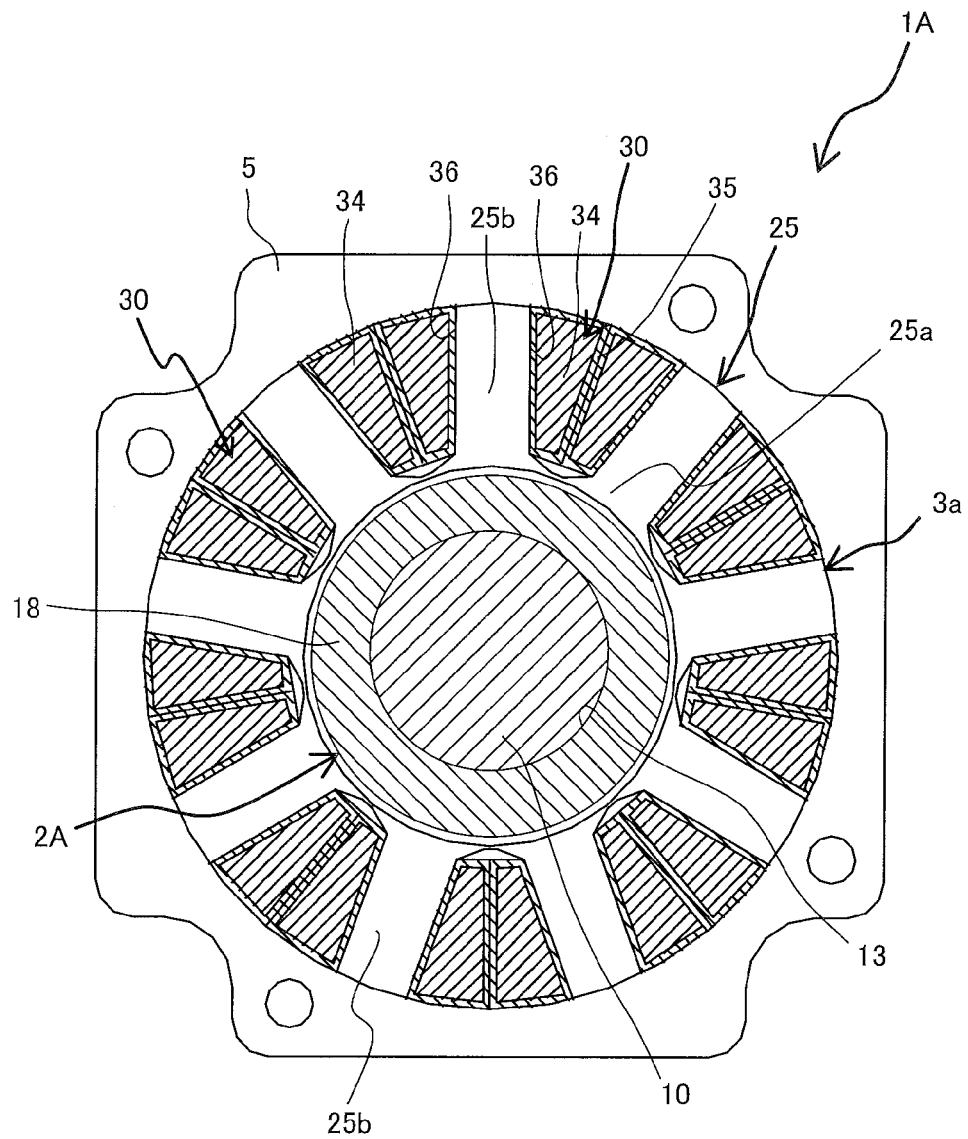

COIL, ROTATING ELECTRICAL MACHINE, AND METHOD OF MANUFACTURING COIL

CROSS-REFERENCE TO RELATED APPLICATION

This is a continuation application of PCT/JP2013/050069, filed Jan. 8, 2013, which was not published under PCT article 21(2) in English.

TECHNICAL FIELD

The present disclosure relates to a coil, rotating electrical machine, and a method of manufacturing a coil.

BACKGROUND

A coil configured by winding a conductor covered by an insulating film around a bobbin is known.

SUMMARY

According to one aspect of the disclosure, there is provided a coil. The coil includes a wound body and a resin covering. The wound body is configured by winding a conductor. The wound body is pressure-moulded. The resin covering covers a surface of the wound body.

Further, according to another aspect of the disclosure, there is provided a method of manufacturing a coil configured to be inserted into slots of a stator core of a rotating electrical machine. The method comprises winding, forming, and covering. In the winding, a conductor is wound along a revolving direction. In the forming, a wound body is formed by means of press-moulding the wound conductor so that an outer shape of the wound conductor matches a shape of the corresponding slot. In the covering, a surface of the wound body is covered by using resin.

BRIEF DESCRIPTION OF THE DRAWINGS

FIG. 1 is an axial-direction cross-sectional view of a rotating electrical machine related to embodiment 1.

FIG. 2 is a transverse cross-sectional view of the II-II cross-section in FIG. 1.

FIG. 3 is an outer appearance view of the annular coil body wherein the coil of the stator of the rotating electrical machine is arranged in an annular shape.

FIG. 4 is an explanatory view showing the mounting of the stator core to the coil of the annular coil body.

FIG. 5 is an outer appearance view of the coil.

FIG. 6 is a stator axial-direction cross-sectional view of the coil.

FIG. 7 is a cross-sectional view showing the winding method of the conductor of the coil.

FIG. 8A is a cross-sectional view showing the pressure-moulding method of the outer shape of the wound body in which the conductor is wound.

FIG. 8B is a cross-sectional view showing the pressure-moulding method of the outer shape of the wound body in which the conductor is wound.

FIG. 8C is a cross-sectional view showing the pressure-moulding method of the outer shape of the wound body in which the conductor is wound.

FIG. 9A is a cross-sectional view showing the pressure-moulding method of the outer shape of the wound body.

FIG. 9B is a cross-sectional view showing the pressure-moulding method of the outer shape of the wound body.

FIG. 9C is a cross-sectional view showing the pressure-moulding method of the outer shape of the wound body.

FIG. 10A is a side view showing the wound body set inside a metal mould.

FIG. 10B is a conceptual plan view showing the same as viewed from the arrow M direction in FIG. 10A.

FIG. 10C is a conceptual plan view showing the resin poured into the metal mould.

FIG. 10D is a conceptual plan view showing the state after the resin hardens.

FIG. 10E is a side view showing the state after the resin hardens.

FIG. 11A is an explanatory view showing the contents of second covering processing of the resin covering of the wound body front surface.

FIG. 11B is an explanatory view showing the contents of second covering processing of the resin covering of the wound body front surface.

FIG. 12A is a side view showing the wound body set inside the metal mould in the first covering processing of a modification in which the resin covering of the wound body front surface is performed one-half at a time.

FIG. 12B is a conceptual cross-sectional view of the N1-N1 cross-section in FIG. 12A.

FIG. 12C is a conceptual cross-sectional view of the N2-N2 cross-section in FIG. 12D showing the resin poured into the metal mould.

FIG. 12D is a side view showing the state after the resin hardens.

FIG. 13A is a side view showing the wound body set inside the metal mould in the second covering processing.

FIG. 13B is a conceptual cross-sectional view of the N3-N3 cross-section in FIG. 13A.

FIG. 13C is a conceptual cross-sectional view of the N4-N4 cross-section in FIG. 13D showing the resin poured into the metal mould.

FIG. 13D is a side view showing the state after the resin hardens.

FIG. 14A is a cross-sectional view showing a modification in which the pressure in the space interposed between the wound body and mould is decreased and the mould is brought in close proximity to the wound body at the time of resin inflow.

FIG. 14B is a cross-sectional view showing a modification in which the pressure in the space interposed between the wound body and mould is decreased and the mould is brought in close proximity to the wound body at the time of resin inflow.

FIG. 15 is an outer appearance view of the coil in embodiment 2.

FIG. 16 is a perspective view showing the outer shapes of the primary covering layer and the secondary covering layer of the wound body of the coil shown in FIG. 15 using solid lines and chain double-dashed lines, respectively.

FIG. 17 is a conceptual side view showing the wound body set inside the primary mould.

FIG. 18 is a conceptual side view showing the primary moulding moulded by the primary covering of the wound body.

FIG. 19 is a conceptual side view showing the coil moulded by the secondary covering of the primary moulding.

FIG. 20 is an axial-direction cross-sectional view of a rotating electrical machine related to embodiment 3.

FIG. 21 is a transverse cross-sectional view of the XXI-XXI cross-section in FIG. 20.

DESCRIPTION OF THE EMBODIMENTS

The following describes embodiments with reference to accompanying drawings.

First, embodiment 1 will be described using FIGS. 1-11.
General Configuration of Rotating Electrical Machine The configuration of the rotating electrical machine in embodiment 1 will now be described using FIG. 1 and FIG. 2.

As shown in FIG. 1 and FIG. 2, the rotating electrical machine 1 in this embodiment comprises a rotor 2, which is a rotatably supported field system, a substantially cylindrical stator 3, which is an armature, a cylindrical frame 5, a load-side bracket 6, a load-side bearing 7, a counter-load side bracket 8, a counter-load side bearing 9, and a shaft 10 (equivalent to a rotating shaft). The rotating electrical machine 1 is an embedded magnet synchronous motor comprising the rotor 2 inside the stator 3.

The frame 5 is disposed on the outer circumference side of the stator 3. The load-side bracket 6 is disposed on the load side (the right side in FIG. 1) of the frame 5. The counter-load side bracket 8 is disposed on the counter-load side (the left side in FIG. 1) of the frame 5. The load-side bracket 6 and the counter-load side bracket 8 are connected to the frame 5 by bolts (not shown).

The outer ring of the load-side bearing 7 is fitted to the load-side bracket 6. The outer ring of the counter-load side bearing 9 is fitted to the counter-load side bracket 8. The shaft 10 is rotatably supported by the load-side bracket 6 and the counter-load side bracket 8 via the load-side bearing 7 and the counter-load side bearing 9. An encoder 12 that detects a rotating position of the rotor 2 is disposed on the counter-load side (the left side in FIG. 1) of the shaft 10. On the load-side bracket 6, a dust seal 11 is disposed further on the axial-direction outward side (the right side in FIG. 1) than the load-side bearing 7 to prevent entry of foreign matter into the interior of the rotor 2.

The rotor 2 comprises a substantially cylindrical rotor core 14 comprising an axial-direction hole 13, and an axial-direction permanent magnet 15 embedded in the rotor core 14 in a V-shape per pole. With this arrangement, the rotor 2 is configured as a field system part with an embedded magnet type structure comprising a plurality of (12 in this example) poles. The above described shaft 10 is fitted into the hole 13 of the rotor core 14.

Detailed Structure of Stator

The stator 3 is disposed so as to enclose a radial-direction outer circumference side of the rotor 2 with a magnetic air gap therebetween, and is fixed to the above described load-side bracket 6 and the above described counter-load side bracket 8. The stator 3 comprises a substantially cylindrical stator core 22 wherein a plurality of radial-direction slots 21 is arranged in the circumferential direction, and a plurality of (12 in this example) coils 30 inserted (housed) in the above described plurality of slots 21. The coil 30 is formed by covering a surface of a wound body 34 with a resin covering 35. Note that the coil 30 is a so-called air-core coil in this example, but is not limited thereto. A connecting part 16 of the coil 30 is disposed on the counter-load side end surface of the stator core 22. An external power source is connected to the connecting part 16 via a lead wire (not shown), and power is supplied from the external power source to the coil 30 via the connecting part 16. The wound body 34 corresponds to an example of means for winding a conductor along a revolving direction, described in claims. The resin covering 35 corresponds to an example of means for covering a surface of the means for winding, described in claims.

The stator core 22 is configured by arranging a plurality of (12 in this example) divided core elements 23 with a substantially fan-shaped transverse cross-section across the entire circumference, along the inner circumferential surface of the frame 5. Each of the divided core elements 23 comprises a tooth 24 with a rectangular transverse cross-sectional shape, on the radial-direction inside. At this time, the slot 21 is formed between the teeth 24, 24 respectively included in adjacent divided core elements 23, 23. With this arrangement, the plurality of slots 21 is disposed across the entire circumferential-direction circumference so as to extend along the inner circumferential surface of the above described frame 5. The slots 21 correspond to the teeth 24 with rectangular transverse cross-sectional shapes, and are each formed so as to be fan-shaped with the transverse cross-sectional shape narrowing toward the radial-direction inside.

The above described plurality of (12 in this example) coils 30 is arranged in a circumferential direction so that one conductor end part 31a (winding start part) and the other conductor end part 31b (winding end part) of the coil 30 are positioned on the counter-load side (equivalent to the other axial-direction side), forming a cylindrical shape, as shown in FIG. 3. Then, the disc-shaped connecting part 16 comprising a lead-out hole 16a that leads the conductor end parts 31a, 31b out is attached to the above described counter-load side end surface of the plurality of coils 30 arranged in a cylindrical shape, thereby assembling the plurality of coils 30 as a cylindrical coil assembly 30A, as shown in FIG. 4. Then, the axial-direction end of the coil assembly 30A on the side opposite the conductor end parts 31a, 31b (equivalent to one axial-direction side) of the coil 30 is fitted to a conical concave part 6b on the inside of an annular attaching part 6a disposed on the load-side bracket 6, thereby attaching the above described coil assembly 30A to the load-side bracket 6.

Subsequently, as shown in FIG. 4, the teeth 24 of the divided core elements 23 are respectively fit into coil holes 32 of the plurality of coils 30 from the outer circumference side of the coil assembly 30A, across the entire circumference of the coil assembly 30A. At this time, the coils 30 of the coil assembly 30A are housed in each of the slots 21 formed between the teeth 24, 24 of two adjacent divided core elements 23, 23. With this arrangement, the annular stator core 22 is constructed by the plurality of (12 in this example) divided core elements 23. As a result, the stator 3 wherein the coil assembly 30A and the above described stator core 22 are integrally assembled is completed (refer to FIG. 2).

Detailed Configuration of Coil

The coil 30, as shown in FIG. 5 and FIG. 6, comprises the above described wound body 34 that winds the conductor 31 that is insulation-covered by an insulating film 33 in a revolving direction and is pressure-moulded so that its outer shape matches the shape of the corresponding slot 21, and the resin covering 35 that covers so as to cover the surface of the wound body 34. That is, the insulation between the outer shape of the resin covering 35 and the section that contacts the outer shape is achieved by the above described insulating film 33 and the resin covering 35.

The above described coil hole 32 surrounded by the resin covering 35 is formed on the revolving direction inside of the wound body 34. The resin that forms the insulating film 33 (equivalent to the first resin) comprises insulation capabilities, and comprises thermal fusion capabilities. With this arrangement, the conductors 31 comprising the insulating film 33 function as bond wires that thermally fuse to each other. The resin covering 35 of the wound body 34 is formed by a resin 53 that differs from the resin that forms the insulating film 33 (equivalent to the second resin; refer to FIG. 10 and the like described later). For example, the resin that forms this resin covering 35 comprises insulation capabilities, and comprises high heat conduction capabilities.

The resin covering 35 comprises an outer shape made of a first surface P1, a second surface P2, a third surface P3, a fourth surface P4, a fifth surface P5, a sixth surface P6, and the like.

The first surface P1 comprises a partially cylindrical surface positioned on one side (an outer circumference side of the slot 21) of the conductor 31 along a first direction orthogonal to the revolving direction (a winding axis direction of the coil 30; the radial direction of the stator core 22). The second surface P2 comprises a partially cylindrical surface positioned on the other side (the inner circumference side of the slot 21) along the above described first direction.

The third surface P3 comprises a partially conical surface positioned on one side (the load side of the rotating electrical machine 1) of the first surface P1 and the second surface P2 along the second direction orthogonal to the above described first direction (the axial direction of the stator core 22). This third surface P3 is a surface that can be adhered tightly to a bottom surface 6ba (refer to FIG. 1) on the load side that comprises a part of the above described concave part 6b of the attaching part 6a of the load-side bracket 6. That is, the coil 30 is disposed so that the third surface P3 is substantially adhered tightly to the above described bottom surface 6ba of the load-side bracket 6 (refer to FIG. 1).

The fourth surface P4 comprises a flat surface positioned on the other side (the counter-load side of the rotating electrical machine 1) of the first surface P1 and the second surface P2 along the above described second direction. In other words, the fourth surface P4 is a flat surface wherein the disc along the above described connecting part 16 is divided into a plurality in the circumferential direction.

The fifth surface P5 comprises a flat surface disposed on one side (refer to FIG. 5; the circumferential direction clockwise side of the stator core 22) along a third direction orthogonal to the above described first direction and second direction (that is, the circumferential direction of the stator core 22). The sixth surface P6 comprises a flat surface disposed on the other side (the circumferential direction counterclockwise side of the stator core 22) along the above described third direction.

Furthermore, the outer shape of the resin covering 35 comprises a first corner part Q1 that connects the third surface P3 and the fifth surface P5, and a second corner part Q2 that connects the third surface P3 and the sixth surface P6. At this time, when the plurality of coils 30 is adjacently disposed in the above described plurality of slots 21, the first corner part Q1 and the second corner part Q2 are each configured so as to be substantially adhered tightly without an air gap produced with the other adjacent coil 30 (refer to FIG. 3).

Overview of Method of Manufacturing Coil

Next, the method of manufacturing the coil 30 with the above described configuration will be described using FIGS. 7-11. As described above, the above described conductor 31 used in the coil 30 is a round copper wire of a bond wire covered by the above described insulating film 33. The coil 30 is manufactured by a first step for winding the above described conductor 31 in the circumferential direction, a second step for pressure-moulding the outer shape of the wound body 34 achieved by this first step, and a third step for covering the surface of the above described wound body 34 after the second step using the insulating resin, after the wound conductor 31 is adhered and solidified.

First Step: Winding the Conductor

First, as the first step, the conductor 31 is wound in the circumferential direction. That is, as shown in FIG. 7, a winding upper spacer 42 and a winding lower spacer 43 are fixed to a core pin 40, which is a moulding jig used for pressure moulding, at a predetermined interval. Subsequently, the core pin 40 is inserted and fixed in a die 41, which is a similar moulding jig, and the insulation-covered conductor 31 is coiled and wound in the circumferential direction around the core pin 40, between the winding upper spacer 42 and the winding lower spacer 43.

Note that FIG. 7 shows both the winding sequence and position in a case where the transverse cross-section orthogonal to the axial direction when the coil 30 is mounted to the stator core 22 is viewed from the counter-load side. Note that the upper side in FIG. 7 is equivalent to the above described one first direction side, and the lower side is equivalent to the above described other first direction side. An X mark shown on the conductor 31 wound on the core pin 40 indicates a conductor wound on the load side, a positive number shown on the conductor 31 indicates the sequence in which the conductor 31 wound on the load side comes out from the illustrated right side, and a negative number shown on the conductor 31 indicates the sequence in which the conductor 31 wound on the load side comes out from the illustrated left side. As illustrated, the conductor 31 is wound so that the number of windings of the outside layer is at least one turn less than the number of windings of the inside layer. In a range other than the counter-load side coil end, the conductor 31 is wound by perfectly aligned winding, and all crossings of the conductor 31 are made on the counter-load side coil end. Then, as described above, the conductor end parts 31a, 31b of the coil 30 are disposed on the counter-load side coil end. Accordingly, the conductor 31 is wound by aligned winding at high speed, making it possible to achieve the wound body 34 (before moulding) wherein the conductor 31 is wound on the core pin 40.

Second Step: Pressure Moulding the Wound Body

Next, as the second step, the outer shape of the wound body 34 is pressure-moulded. That is, first, as shown in FIG. 8A, the above described winding upper spacer 42 and winding lower spacer 43 are removed from the core pin 40, and a punch 44 is mounted to the core pin 40. Subsequently, the punch 44 is descended, causing the above described wound body 34 wound on the core pin 40 as described above to be pressed to the die 41. At this time, a concave part 41a having a shape corresponding to the above described slot 21 is disposed in the die 41, and this concave part 41a and the core pin 40 function in coordination as a pressure increasing part. The concave part 41a comprises a substantially inverted square pyramid frustum outer shape, with the bottom surface curved convexly upward. The bottom surface of the punch 44 is curved convexly upward. As shown in FIG. 8A and FIG. 8B, the outer shape of the wound body 34 positioned on the concave part 41a is pressure-moulded into a substantially inverted square pyramid frustum shape as the punch 44 descends. Then, when the punch 44 is descended to a predetermined contour line S shown in FIG. 8A, the outer shape of the wound body 34 is roughly moulded into a shape that substantially matches the shape of the slot 21, as shown in FIG. 8C.

After the above, the wound body 34 with the roughly moulded outer shape is subjected to final high-precision pressure moulding using the moulding jig shown in FIG. 9A. That is, the above described roughly moulded wound body 34 is mounted to a square rod shaped die 45 and held in a split mould 46 along with the die 45. The die 45 comprises an inclined part 45a with a substantially inverted square pyramid frustum outer shape for increasing pressure, and the wound body 34 is mounted to the above described inclined part 45a. The split mould 46 comprises a first mould 46a and a second mould 46b, forming at least two split moulds wherein each of the moulds 46a, 46b is movable.

Further, the split mould 46 comprises a guide hole 48 and the like that guides the movement of a punch 47 and the like in the surrounding area. The punches 47 on the left and the right (on one side and the other side of the above described third direction) in the figure respectively curve convexly upward and comprise a flat plate shaped pressure increasing surface 47a. The left and right above described guide holes 48 comprise curved shapes corresponding to the shapes of the punches 47. Note that, at this time, front and rear punches (on one side and the other side of the above described second direction; not shown) may also be used in addition to the above described punches 47. Of these, the front-side (above described other second-direction side) punch comprises a substantially flat plate shaped pressure-increasing surface comprising a hole through which the conductor end parts 31a, 31b of the coil 30 are inserted, and the rear-side (the above described one second-direction side) punch comprises a partially conical pressure-increasing surface.

Then, the above described left and right punches 47, 47 moved along the guide hole 48 as shown in FIG. 9B, and the above described front and rear punches moved along the guide hole (not shown) are press-contacted by the wound body 34 mounted to the inclined part 45a, thereby pressure-moulding the wound body 34. With this arrangement, the inner shape of the wound body 34 is moulded in the above described coil hole 32 having a shape that matches the outer shape of the teeth 24 of the stator core 22, and the outer shape of the wound body 34 is moulded into a shape that matches the inner shape of the slot 21 of the stator core 22, thereby completing the pressure moulding of the wound body 34.

With the above pressure moulding, the entire outer shape of the wound body 34, excluding the conductor end parts 31a, 31b, is moulded, making it possible to achieve the correct outer shape dimensions of the coil 30. With the moulded wound body 34 mounted to the moulding jig as is, for example, electricity is conducted from the conductor end parts 31a, 31b (refer to FIG. 5 and the like) exposed from the near side end of the wound body 34 to the conductor 31, melting the insulating film 33 by the heat generation of the conductor 31 and adhering and solidifying the adjacent conductors 31 by the thermal fusion of the insulating film 33. Note that, in a case where a non-bond wire without thermal fusion characteristics is used in the insulating film 33 of the conductor 31, a thermosetting adhesive may be applied on the surface of the insulating film 33 of the conductor 31 of the wound body 34 and thermally hardened to adhere and solidify the conductors 31 to each other. The wound body 34 in which the conductors 31 are adhered and solidified to each other are extracted and removed along with the die 45 by moving outward and removing each of the second moulds 46b of the split mould 46, as shown in FIG. 9C.

Third Step: Covering Processing of Wound Body

Next, as the third step, covering processing in which the surface of the wound body 34 subjected to the above described adhering and solidifying is covered by the above described resin is performed. Note that this covering processing includes a first covering processing step for covering a part of the surface of the wound body 34, and a second covering processing step for covering the remaining section of the surface of the wound body 34 that was not covered in the first covering processing step.

First Covering Processing Step

The first covering processing of the wound body 34 will now be described using FIG. 10. In FIG. 10A and FIG. 10B, a metal mould 50 used in the first covering processing in this example comprises a split mould made of two moulds facing each other, and the metal mould 50 is assembled, thereby forming a predetermined air gap 51 with the surface of the wound body 34. Note that while the thickness-direction dimension of the air gap 51 is actually extremely small compared to the dimension of the wound body 34, the air gap 51 is shown exaggerated in size in the figure for clarification (the same holds true for the resin covering 35 described later as well). After the wound body 34 is inserted inside this metal mould 50, suitable locations (four front and back locations of two parallel linear parts in this example) of the wound body 34 are supported by a plurality of support parts (four rod members in this example) 52 comprising protrusions, holding the wound body 34 positioned inside the metal mould 50. Note that the support part 52 may be a protrusion part integrally disposed with the metal mould 50 so as to expand from the mould surface (inner wall surface) that faces the air gap 51 of the metal mould 50 to the air gap 51, rather than a rod member separate from the metal mould 50. Further, the supported locations are not limited to the locations illustrated, and different areas, such as the inner circumference side of the wound body 34, for example, may be supported. Furthermore, the wound body 34 may be supported in a greater number of (six, for example) locations.

Next, after the metal mould 50 is closed and clamped, a resin 53 is made to flow from a runner (not shown) into the metal mould 50 and sealed in the air gap 51 between the metal mould 50 and the wound body 34, as shown in FIG. 10C. Subsequently, when the metal mould 50 is opened after waiting for the resin 53 to harden and the support parts 52 are removed, the coil 30 in which substantially the entire surface of the surface of the wound body 34 (equivalent to the first covering part) is covered by the resin covering 35 resulting from the resin 53 is achieved, as shown in FIG. 10D and FIG. 10E.

At this time, since the resin 53 is not made to flow into the locations where the wound body 34 is supported by the support parts 52, a depression part 54 that is opened to the outside, leading to the surface of the wound body 34, remains in locations corresponding to the support parts 52 of the resin covering 35 of the coil 30. Nevertheless, a rod member is used as the support part 52 in the above described example, and therefore the depression part 54 that occurs in the resin covering 35 by non-inflow of the resin 53 is a concave-shaped groove. As a result, locations of the surface of the wound body 34 that are not covered with resin can be minimized as necessary.

Second Covering Processing Step

The second covering processing of the wound body 34 will now be described using FIG. 11. In FIG. 11A, a mould (not shown) is made to face the above described depression parts 54, where the wound body 34 was not covered, while disposing a predetermined air gap, and the above described resin 53 is sealed in the air gap. With this arrangement, the depression parts 54 are filled with the resin 53 and covered so as to become flush with the surrounding area (the section filled and covered is equivalent to the second covering part), as shown in FIG. 11B. With this arrangement, the coil 30 in which the entire surface of the wound body 34 is completely covered by the resin covering 35 resulting from the resin 53 is achieved.

Note that a resin with enhanced thermal conductivity may be used as the resin 53 in the first covering processing step, while a resin with enhanced fluidity may be used as the resin 53 in the second covering processing step for filling the depression parts 54. That is, the second covering processing for covering the depression parts 54 is positioned for repairing the first covering processing, and the object of the second covering processing can be easily achieved by using a resin with high fluidity and extremely favourable permeability, such as varnish, as the resin 53.

Advantages of Embodiment 1

As described above, in the above described embodiment 1, the plurality of coils 30 is housed in the plurality of slots 21 disposed in the stator core 22 of the stator 3 of the rotating electrical machine 1. Each of the coils 30 is pressure-moulded so that the wound body 34 configured by winding the conductor 31 covered by the insulating film 33 of a predetermined resin (first resin) matches the shape of the disposed slot 21. Then, the surface of the above described pressure-moulded wound body 34 is completely covered using the resin 53 (second resin) that differs from the above described predetermined resin.

With this arrangement, a suitable resin comprising a preferred insulation function is used as the above described resin 53, for example, making it possible to eliminate the need of a bobbin for winding and insulating the conductor 31, which has been used in prior art. As a result, the space where the conductor 31 can actually be disposed inside the slot 21 can be increased in size, making it possible to use the conductor 31 with a larger diameter than prior art. Further, the space factor, which is the actual coil disposition capacity of the coil 30 that occupies the disposition space inside the slot 21, can be improved by the pressure moulding of the wound body 34 before being covered by the first resin 53. As a result, the output of the rotating electrical machine 1 can be increased. Additionally, by further using a resin comprising high thermal conductivity as the above described resin 53, for example, it is possible to efficiently release the heat generated by the coil 30. As a result, the cooling capabilities of the coil 30 can be improved, making it possible to increase the output of the rotating electrical machine 1 in this manner as well.

Further, in particular, according to this embodiment, the outer shape of the resin covering 35 of the coil 30 comprises the first surface P1 and the second surface P2 made of partially cylindrical surfaces, the third surface P3 made of a partially conical surface, and the fourth surface P4 made of a flat surface, in accordance with the slot shape where the coil 30 is disposed. With this arrangement, it is possible to reliably improve the coil space factor, and it is possible to increase the adhesion between the coil 30 and the slot 21 of the stator core 22 as well as the bracket 6 and thus improve cooling capabilities. As a result, the output of the rotating electrical machine 1 can be reliably increased.

Further, in particular, according to this embodiment, when the plurality of coils 30 is adjacently disposed in the plurality of slots 21, the first corner part Q1 that connects the above described third surface P3 and the above described fifth surface P5, and the second corner part Q2 that connects the above described third surface P3 and the above described sixth surface P6 are substantially adhered tightly to the other adjacent coil 30. With this arrangement, when the coils 30 are respectively disposed in the slots 21, the area occupied by the resin 53 is made as small as possible and the coil 30, the slot 21 of the stator core 22, as well as the bracket 6 are brought in close proximity to the extent possible, making it possible to facilitate heat release from the coil 30 to the bracket 6 and the stator core 22.

Further, in this embodiment, as described above, in a case where substantially the entire surface of the wound body 34 is to be covered by the resin 53, the metal mould 50 is made to face the surface of the wound body 34 while disposing a predetermined air gap 51 therebetween, and the resin 53 is sealed in the air gap 51 to cover the surface. At this time, while the surface of the wound body 34 needs to be supported in some way, according to this embodiment, the surface of the wound body 34 is directly supported by the support parts 52. At this time, the resin 53 does not flow into the locations where the support parts 52 exist, and therefore the above described depression parts 54 occur in the resin covering 35 after the covering processing is completed. Nevertheless, substantially the entire surface of the wound body 34 other than the depression parts 54 (concave-shaped grooves in the above described example) can be reliably covered by the resin 53. As a result, the output of the rotating electrical machine 1 can be reliably increased.

Further, in particular, according to this embodiment, a mould is made to face the depression parts 54 where the resin covering 35 was not formed on the wound body 34 in the above described first covering processing while disposing a predetermined air gap therebetween, and the resin 53 is sealed in the air gap to perform the second covering processing. With this arrangement, the entire surface of the wound body 34 is reliably covered by the resin 53, making it possible to more reliably increase the output of the rotating electrical machine 1.

Further, in particular, according to this embodiment, the coil 30 comprises one conductor end part 31a, which is a winding start part of the conductor 31, and the other conductor end part 31b, which is a winding end part of the conductor 31, on the counter-load side, and the conductor 31 of the wound body 34 is wound by aligned winding, excluding the above described counter-load side section.

With this arrangement, it is possible to insert and dispose the orderly arranged conductor 31 into the slot 21 of the stator core 22 and easily realize a structure with a high space factor. Further, the winding start part (one conductor end part 31a) and the winding end part (the other conductor end part 31b) of the conductor 31 are disposed on the outside of the wound body 34, making it possible to smoothly and easily connect the connecting substrate and the conductor 31 on the outside of the covered wound body 34, for example.

Further, in particular, according to this embodiment, the third surface P3 of the resin covering 35 is disposed so as to be substantially adhered tightly to the load-side bracket 6. With this arrangement, it is possible to further facilitate heat release from the coil 30 to the bracket 6 via the third surface P3 of the resin covering 35.

Further, in particular, according to this embodiment, the insulation between the outer shape of the resin covering 35 and the section that contacts the outer shape comprises the insulating film 33 of the conductor 31 and the resin covering 35. With this arrangement, the bobbin for winding and insulating the conductor 31 is reliably no longer needed, making it possible to increase the space where the conductor 31 can be disposed inside the slot 21 and thus use a conductor with a large diameter.

Modifications

Note that the present disclosure is not limited to the above, and various modifications may be made without deviating from the spirit and scope of the disclosure. The following describes such modifications.
(1) When the Resin Covering of the Surface of the Wound Body is Performed One-Half at a Time According to the above described embodiment 1, a resin covering is formed on substantially the entire surface other than the locations where the support parts 52 exist in the first covering processing, and then a resin covering is formed on the remaining depression parts 54 in the second covering processing. Conversely, in this modification, the resin covering 35 is formed one-half at a time, dividing the surface into the surface on the stator radial-direction outer circumference side and both circumferential direction sides of the wound body 34, and the surface on the stator radial-direction inner circumference side and coil hole 32 inside of the wound body 34. Such an embodiment will now be described using FIG. 12 and FIG. 13.
First Covering Processing Step First, the first covering processing of the wound body 34 will be described using FIG. 12. In FIG. 12A and FIG. 12B, a metal mould 55 used in the first covering processing comprises a first metal mould 56 and a second metal mould 58 in this example. The first metal mould 56 comprises a protrusion part 56*a* that contacts the surface on the stator radial-direction inner circumference side and coil hole 32 inside of the wound body 34. A tapered part 56*b* that widens in the direction opposite the protruding direction of the protrusion part 56*a* is formed on both base end surface sides of the protrusion part 56*a*. A second metal mould 58 comprises a substantially box-like shape, positioned with a predetermined air gap 57 between itself and the surface on the stator radial-direction outer circumference side and both circumferential direction sides of the wound body 34. Note that while the thickness-direction dimension of the air gap 57 is actually extremely small compared to the dimension of the wound body 34, the air gap 57 is shown exaggerated in size in the figure for clarification (the same holds true for the resin 53 described later as well). When the metal mould 55 is closed, the protrusion part 56*a* of the first metal mould 56 contacts a planar part 58*b* of the second metal mould 58, and a side wall part 58*a* of the second metal mould 58 contacts the tapered part 56*b* of the first metal mould 56.

Next, after the metal mould 55 is closed and clamped, the resin 53 is made to flow from a runner (not shown) into the metal mould 55, as shown in FIG. 12C. Then, the resin 53 is sealed in the air gap 57, between the metal mould 55 and the surface on the stator radial-direction outer circumference side and both circumferential direction sides of the wound body 34. Subsequently, when the metal mould 55 is opened after waiting for the resin 53 to harden, the resin covering 35 resulting from the resin 53 is formed on the surface on the stator radial-direction outer circumference side and both circumferential direction sides of the wound body 34 (equivalent to the first covering part), as shown in FIG. 12D.
Second Covering Processing Step The second covering processing will now be described using FIG. 13. In FIG. 13A and FIG. 13B, a metal mould 60 used in the second covering processing comprises a first metal mould 61 and a second metal mould 62 in this example. The first metal mould 61 comprises a protrusion part 61*a* positioned with a predetermined air gap 63 between itself and the surface on the stator radial-direction inner circumference side and coil hole 32 inside of the wound body 34. A tapered part 61*b* that widens in the direction opposite the protruding direction of the protrusion part 61*a* is formed on both base end surface sides of the protrusion part 61*a*. The second metal mould 62 comprises a substantially box-like shape that encloses the first metal mould 61 along with the resin covering 35 of the surface on the stator radial-direction outer circumference side and both circumferential direction sides of the wound body 34. Note that while the thickness-direction dimension of the air gap 63 is actually extremely small compared to the dimension of the wound body 34, the air gap 63 is shown exaggerated in size in the figure for clarification (the same holds true for the resin 53 described later as well). When the metal mould 60 is closed, the second metal mould 62 contacts the resin covering 35 of the surface on the stator radial-direction outer circumference side and both circumferential direction sides already formed by the above described first covering processing step of the wound body 34, and contacts the above described protrusion part 61*a* and the tapered part 61*b* of the first metal mould 61.

Next, after the metal mould 60 is closed and clamped, the resin 53 is made to flow from a runner (not shown) into the metal mould 60, as shown in FIG. 13C. Then, the resin 53 is sealed in the air gap 63, between the metal mould 60 and the surface on the stator radial-direction inner circumference side and the coil hole 32 inside of the wound body 34. Subsequently, when the metal mould 60 is opened after waiting for the resin 53 to harden, the resin covering 35 resulting from the resin 53 is newly formed on the surface on the stator radial-direction inner circumference side and the coil hole 32 inside of the wound body 34 (equivalent to the second covering part), as shown in FIG. 13D.

With the above, the coil 30 in which the entire surface of the wound body 34 is covered by the resin covering 35 resulting from the resin 53 is achieved. According to this modification as well, substantially the entire surface of the wound body 34 is reliably covered by the resin 53, making it possible to more reliably increase the output of the rotating electrical machine 1.

Further, similar to the above described embodiment 1, the mould 60 is made to face the section where the resin covering 35 was not formed on the wound body 34 in the above described first covering processing while disposing a predetermined air gap 63 therebetween, and the resin 53 is sealed in the air gap 63 to perform the second covering processing. With this arrangement, the entire surface of the wound body 34 is reliably covered by the resin 53, making it possible to more reliably increase the output of the rotating electrical machine 1.

Note that, in this modification as well, similar to the above described embodiment 1, a resin with enhanced thermal conductivity may be used as the resin 53 in the first covering processing step, while a resin with enhanced fluidity may be used as the resin 53 in the second covering processing step.

Further, the partially conical surface disposed on at least one side of the second surface P2 and the nearby area thereof of the surface of the wound body 34 may be covered while using a resin with enhanced thermal conductivity as the resin 53 in the first covering processing step, and the remaining section that was not covered in the first covering processing step may be covered using a resin with enhanced fluidity as the resin 53 in the second covering processing step. In this case, the entire wound body 34 is not covered using a highly thermally conductive resin, but rather only the third surface P3 that affects the heat release characteristics to the load-side bracket 6 is covered using the highly thermally conductive resin, and a resin with high fluidity that is less susceptible to deficiencies, such as non-filling, which causes insulation defects, is used for the other sections of the wound body 34, thereby resulting in the advantage of being able to easily ensure the reliability of the insulation of the coil 30.

(2) When Performing Space Decompression and the Like

That is, according to this modification, when the resin 53 is made to flow into the space interposed between the wound body 34 and the mould, the space is decompressed and the space is made smaller. Such a modification will now be described using FIG. 14.

According to this modification, as shown in FIG. 14A, the wound body 34 wherein the pressure moulding of the outer shape is completed and the adhering and solidification of the conductor 31 is ended as described above is mounted to a tapered mounting part 65a of a square rod shaped holder 65. Then, the above described holder 65 where the wound body 34 is mounted is attached to a split mould 66. This split mould 66 comprises a first mould 66a and a second mould 66b, forming at least two split moulds wherein each of the moulds 66a, 66b is movable. Then, each of the second moulds 66b, 66b are moved outward away from each other, forming a first passage 67a between one second mould 66b (on the illustrated right side) and the holder 65, and forming a second passage 67b between the other second mould 66b (on the illustrated left side) and the holder 65. At this time, an air gap 71 is formed around the split mould 66, excluding the illustrated left and right sides (one side and the other side of the stator circumferential direction) of the wound body 34. Further, the split mould 66 comprises a guide hole 68 on the illustrated left and right sides of the wound body 34. Press moulds 69, 69 are disposed away from each other in the guide holes 68, 68 on the left and right of the wound body 34, thereby forming a wide space 70. The space 70 is communicated with the air gap 71.

Then, as shown in FIG. 14A, the inside of the space 70 is vacuumed via the second passage 67b by a suitable pump and the like connected to the second passage 67b. With this arrangement, the resin 53 is made to flow into the space 70 via the first passage 67a under reduced pressurized conditions of the space 70. At this time, the space 70 is widely defined by separating the press mould 69 as described above, thereby making it easy to make the resin 53 flow into the space 70 and fill the area around the wound body 34.

Subsequently, as shown in FIG. 14B, the left and right press moulds 69, 69 are brought in close proximity to the wound body 34 so that the space 70 becomes narrow, thereby pressing the resin 53. With this arrangement, the air gap 71 and the unevenness on the surface of the wound body 34 are impregnated with the resin 53. Subsequently, at the moment when the space 70 is narrowed to the same extent as the air gap 71, the movement of the press mould 69 is stopped and, after waiting for the resin 53 to harden, the wound body 34 is removed. With this arrangement, the coil 30 in which substantially the entire surface of the surface of the wound body 34 is covered by the resin covering 35 is formed.

In this modification, the following advantages can be achieved. That is, in general, resin comprises properties that make it difficult for the resin to enter narrow spaces. According to this modification, when the surface of the wound body 34 is covered with resin in the third step as described above, the press mould 69 is made to face the wound body 34 while disposing the wide space 70 between itself and the surface of the wound body 34, and the resin 53 is made to flow into the space 70 while the space 70 is further decompressed. After the resin 53 inflow, the press mould 69 is brought in close proximity to the wound body 34 to make the above described space 70 smaller, and the resin 53 is hardened. After the flow of the resin into the wide space 70 is promoted in this manner, the space 70 is made narrower and the resin is hardened. With this arrangement, it is possible to reliably cover substantially the entire surface of the wound body 34 in a thorough manner.

Embodiment 2

Embodiment 2 will now be described using FIGS. 15-19. The components that are the same as those in the above described embodiment 1 will be denoted using the same reference numerals, and descriptions thereof will be suitably omitted or simplified.

In FIG. 15 and FIG. 16, in a coil 30' in this embodiment, the above described resin covering 35 is formed on the above described wound body 34 by the two resin mouldings by a primary covering and a secondary covering resulting from the above described resin 53. That is, according to this embodiment, a primary covering layer 100 (refer to FIG. 16) that covers the outside of the wound body 34 is generated by a first resin moulding, thereby forming a primary moulding 80. Subsequently, a secondary covering layer 200 (refer to FIG. 16) that covers the outside of the primary covering layer 100 is generated by a second resin moulding, thereby forming the coil 30' in which the outside of the above described wound body 34 is covered by the above described resin covering 35 (the primary covering layer 100+the secondary covering layer 200).

The coil 30' is the same as the coil 30 in the above described embodiment 1 for all points other than described above. That is, as shown in FIG. 15, the resin covering 35, similar to the coil 30 in the above described embodiment 1, comprises an outer shape made of the first surface P1, the second surface P2, the third surface P3, the fourth surface P4, the fifth surface P5, the sixth surface P6, and the like. Note that, for the conductor 31 included in the wound body 34 of the coil 30' in this embodiment, the insulating film 33 (refer to the expanded view in FIG. 5) of a predetermined resin (equivalent to the first resin) may be formed in the same manner as the above described embodiment 1, or the insulating film 33 may be omitted. The following describes the details of the formation of the above described primary covering layer 100 and secondary covering layer 200, in order.

Primary Covering Processing Step

The primary covering processing of the wound body 34 will now be described using FIGS. 16-18. During the moulding of the above described primary moulding 80, the wound body 34 is inserted and set into a primary mould of the split mould (not shown). At this time, the wound body 34 is set so that an air gap is formed between the above described primary mould and the surface on the outside (that is, the above described stator radial-direction outer circumference side and inner circumference side, the stator axial-direction one side and other side, and stator circumferential direction one side and other side) of the wound body 34 and the surface on the inside of the coil hole 32 of the wound body 34. FIG. 17 shows the wound body 34 thus set (with the primary covering layer 100 not yet formed; note that the primary mould is omitted to prevent complexities in illustration).

Next, the primary mould is closed and clamped, and then the resin 53 (refer to FIG. 10C, FIG. 12C, and FIG. 13C) is made to flow into the mould interior and sealed in the above described air gap between the wound body 34 and mould. Subsequently, after waiting for the resin 53 to harden, the metal mould is opened, thereby forming the primary covering layer 100 comprising a plurality of protrusion parts (described later) by the resin 53 on the surface on the outside of the wound body 34 and the inside of the coil hole 32 as shown in FIG. 18 and the above described FIG. 16 (equivalent to the primary covering step), generating the primary moulding 80.

With the above, during the moulding of the above described primary moulding 80, the primary moulding by the resin 53 is performed regardless of the position or posture of the wound body 34 inside the interior space of the above described primary mould. With this arrangement, it is possible to achieve the above described primary moulding 80 comprising defined outer diameter dimensions determined in advance.

Details of Primary Covering Layer

The primary moulding 80, as shown in FIG. 18 and FIG. 16, comprises outer surface parts 100a, 100a with a rectangular flat surface, outer surface parts 100b, 100b with a partially cylindrical surface, an outer surface part 100c with a partially conical surface, an outer surface part 100d with a partially annular flat surface, outer surface parts 100e, 100e with a rectangular flat surface, and outer surface parts 100f, 100f with a rectangular flat surface, as the outer surfaces resulting from the primary covering layer 100.

The outer surface part 100a is respectively formed on both sides (the left side and the right side in FIG. 16 and FIG. 18) of the wound body 34 along the stator circumferential direction. Each of the outer surface parts 100a comprises at least one (two in this example) protrusion part 100a1 resulting from the primary covering layer 100, protruded from the outer surface part 100a in the above described circumferential direction in an amount equivalent to a predetermined dimension.

The outer surface part 100b is respectively formed on both sides (the upper side and the lower side in FIG. 16, and the near side and the far side in FIG. 18) of the wound body 34 along the stator radial direction. Each of the outer surface parts 100b comprises at least one (two in this example) protrusion part 100b1 resulting from the primary covering layer 100, protruded from the outer surface part 100b in the above described radial direction in an amount equivalent to a predetermined dimension.

The outer surface part 100c is formed on one side (equivalent to the load side; the far side in FIG. 16 and the upper side in FIG. 18) of the wound body 34 along the stator axial direction. The outer surface part 100c comprises at least one (one in this example) protrusion part 100c1 resulting from the primary covering layer 100, protruded from the outer surface part 100c in the above described axial direction in an amount equivalent to a predetermined dimension.

The outer surface part 100d is formed on the other side (equivalent to the counter-load side; the near side in FIG. 16 and the lower side in FIG. 18) of the wound body 34 along the stator axial direction. In this example, the outer surface part 100d does not comprise a protrusion part resulting from the primary covering layer 100, in particular.

The outer surface part 100e is respectively formed on both sides (the left side and the right side in FIG. 16 and FIG. 18) on the inner circumference side (the inside of the coil hole 32) of the wound body 34 along the stator circumferential direction. Each of the outer surface parts 100e comprises at least one (two in this example) protrusion part 100e1 resulting from the primary covering layer 100, protruded from the outer surface part 100e in the above described radial direction in an amount equivalent to a predetermined dimension.

The outer surface part 100f is respectively formed on both sides (the far side and the near side in FIG. 16, and the upper side and the lower side in FIG. 18) on the inner circumference side (the inside of the coil hole 32) of the wound body 34 along the stator axial direction. Each of the outer surface parts 100f comprises at least one (one in this example) protrusion part 100f1 resulting from the primary covering layer 100, protruded from the outer surface part 100f in the above described axial direction in an amount equivalent to a predetermined dimension.

Secondary Covering Processing Step

The covering when moulding the coil 30' from the above described primary moulding 80 will now be described using FIG. 19. After the primary moulding 80 is moulded as described above, the primary moulding 80 is set in a secondary mould of the split mould. Then, mould resin is poured into the interior of the secondary mould, thereby covering each of the outer surface parts 100a, 100b, 100c, 100d, 100e, 100f of the above described primary covering layer 100 of the primary moulding 80 with the secondary covering layer 200 at a defined thickness determined in advance. With this arrangement, the above described coil 30' comprising the resin covering 35 (the primary covering layer 100+the secondary covering layer 200) is formed on the outside of the wound body 34 (equivalent to the secondary covering step). At this time, the primary moulding 80 is supported on the above described both circumferential direction sides, the above described both radial-direction sides, and the above described both axial-direction sides with respect to the inner wall of the secondary mould via the aforementioned protrusion parts 100a1, 100e1, the protrusion part 100b1, and the protrusion parts 100c1, 100f1, in the interior of the above described secondary mould. As a result, with the above-described resin pouring, the secondary covering layer 200 having the same thickness as the height-direction dimension of each of the protrusion parts 100a1, 100b1, 100c1, 100e1, 100f1 (equivalent to the above described predetermined thickness) is formed on the entire outer surface (excluding each of the above described protrusion parts) of the primary moulding 80, thereby completing the above described coil 30'. Note that the height-direction dimensions of each of the protrusion parts 100a1, 100b1, 100c1, 100e1, 100f1 may be mutually the same or not the same.

Details of Secondary Covering Layer

The coil 30' comprises outer surface parts 200a, 200a with a rectangular flat surface, outer surface parts 200b, 200b with a partially cylindrical surface, an outer surface part 200c with a partially conical surface, an outer surface part 200d with a partial annular flat surface, outer surface parts 200e, 200e with a rectangular flat surface, and outer surface parts 200f, 200f with a rectangular flat surface, as the outer surfaces resulting from the above described secondary covering layer 200 that further covers the outside of the above described primary covering layer 100.

The outer surface part 200a is formed by further covering the outer surface of the outer surface part 100a resulting from the primary covering layer 100 of the above described primary moulding 80 with the secondary covering layer 200 having a thickness equivalent to the height dimension of the protrusion part 100a1 using the aforementioned technique, on both sides (the left side and right side in FIG. 16 and FIG. 19) of the primary moulding 80 along the stator circumferential direction. Of the above described two outer surface parts 200a, the outer surface part 200a on the one side (the left side in FIG. 16 and FIG. 19) along the stator circumferential direction constitutes the above described sixth surface P6 that defines the outer shape of the resin covering 35. The outer surface part 200a on the other side (the right side in FIG. 16 and FIG. 19) along the stator circumferential direction constitutes the above described fifth surface P5 that defines the outer shape of the resin covering 35.

The outer surface part 200b is formed by further covering the outer surface of the outer surface part 100b resulting from the primary covering layer 100 of the above described primary moulding 80 with the secondary covering layer 200 having a thickness equivalent to the height dimension of the protrusion part 100b1 using the aforementioned technique, on both sides (the upper side and lower side in FIG. 16, and the near side and far side in FIG. 19) of the primary moulding 80 along the stator radial dimension. Of the above described two outer surface parts 200b, the outer surface part 200b on the one side (the upper side in FIG. 16 and the near side in FIG. 19) along the stator radial direction constitutes the above described first surface P1 that defines the outer shape of the resin covering 35. The outer surface part 200b on the other side (the lower side in FIG. 16 and the far side in FIG. 19) along the stator radial direction constitutes the above described second surface P2 that defines the outer shape of the resin covering 35.

The outer surface part 200c is formed by further covering the outer surface of the outer surface part 100c resulting from the primary covering layer 100 of the above described primary moulding 80 with the secondary covering layer 200 having a thickness equivalent to the height dimension of the protrusion part 100c1 using the aforementioned technique, on one side (equivalent to the load side; the far side in FIG. 16 and the upper side in FIG. 19) of the primary moulding 80 along the stator axial direction. The outer surface part 200c constitutes the above described third surface P3 that defines the outer shape of the resin covering 35.

The outer surface part 200d is formed by covering the outer surface of the outer surface part 100d resulting from the primary covering layer 100 of the above described primary moulding 80 with the secondary covering layer 200 at a predefined slight thickness, on the other side (equivalent to the counter-load side; the near side in FIG. 16 and the lower side in FIG. 19) of the primary moulding 80 along the stator axial direction. The outer surface part 200d constitutes the above described fourth surface P4 that defines the outer shape of the resin covering 35.

The outer surface part 200e is formed by further covering the outer surface of the outer surface part 100e resulting from the primary covering layer 100 of the above described primary moulding 80 with the secondary covering layer 200 having a thickness equivalent to the height dimension of the protrusion part 100e1 using the aforementioned technique, on both sides (the left side and right side in FIG. 16 and FIG. 19) of the inner circumference side (the inside of the coil hole 32) of the primary moulding 80 along the stator circumferential direction.

The outer surface part 200f is formed by further covering the outer surface of the outer surface part 100f resulting from the primary covering layer 100 of the above described primary moulding 80 with the secondary covering layer 200 having a thickness equivalent to the height dimension of the protrusion part 100f1 using the aforementioned technique, on both sides (the far side and near side in FIG. 16, and the upper side and lower side in FIG. 19) of the inner circumference side (the inside of the coil hole 32) of the primary moulding 80 along the stator axial direction. Note that the above-described the primary covering processing step and the secondary covering processing step correspond to covering in the second embodiment.

Advantages of Embodiment 2

The same advantages as those of the above described embodiment 1 are achieved according to this embodiment configured as described above as well. That is, a suitable resin comprising a preferred insulation function is used as the above described resin 53, for example, making it possible to eliminate the need of a bobbin for winding and insulating the conductor 31, which has been used in prior art. As a result, the space where the conductor 31 can actually be disposed inside the slot 21 can be increased in size, making it possible to use the conductor 31 with a larger diameter than prior art. Further, the space factor, which is the actual coil disposition capacity of the coil 30' that occupies the disposition space inside the slot 21, can be improved by the pressure moulding of the wound body 34 before being covered by the resin 53. As a result, the output of the rotating electrical machine 1 can be increased. Additionally, by further using a resin comprising high thermal conductivity as the above described resin 53, for example, it is possible to efficiently release the heat generated by the coil 30'. As a result, the cooling capabilities of the coil 30' can be improved, making it possible to increase the output of the rotating electrical machine 1 in this manner as well.

Further, according to this embodiment, the following advantages are achieved in addition to the above. That is, according to this embodiment, the coil 30' is manufactured by forming the primary covering layer 100 on the outside of the wound body 34, and then further forming the secondary covering layer 200 on the outside thereof. In the primary covering step, the wound body 34 is put in the above described primary mould, resin is poured into the interior of the mould, and the wound body 34 is covered by the primary covering layer 100. At this time, the outer shape dimensions of the primary moulding 80 made of the wound body 34 covered by the primary covering layer 100 (in other words, the shape dimensions of the space formed in the interior of the above described mould) are controlled. That is, in the interior of the primary moulding 80, the skew and the position of the wound body 34 do not matter.

Then, the above described primary moulding 80 is further put in a different secondary mould, resin is poured into the interior of the mould, and the primary moulding 80 is covered by the secondary covering layer 200. As described above, the outer shape dimensions of the primary moulding 80 are controlled by the above described primary mould with high precision (all outer shape dimensions of the primary moulding 80 are the same, regardless of the position of the wound body 34 in the interior of the primary moulding 80), thereby making it possible to form the secondary covering layer 200 on the outside of the above described primary moulding 80 at a uniform thickness.

As described above, the secondary covering layer 200 is uniformly formed on the outside of the primary moulding 80 wherein the outer shape dimensions are controlled by the primary covering layer 100 with high precision. With this arrangement, it is possible to maintain the minimum required thickness in the resin covering 35 (the primary covering layer 100+the secondary covering layer 200) formed on the outer circumference side of the wound body 34.

Further, when the conductor 31 is wound during the manufacture of the wound body 34 (or when the wound body 34 is subsequently pressure-moulded), which is a preliminary stage of formation of the above described primary covering layer 100, lift of the conductor 31 may occur, for example, causing the wound body 34 to stick out from the outside of the primary mould or to become distorted in shape, and therefore the primary moulding 80 to not always achieve the preferred external dimensions with high precision (hereinafter suitably referred to as "irregular shape"). According to this embodiment 2, even in such a case, the wound body 34 with the above described irregular shape is housed in the interior of the primary mould and the primary mould is closed, making it possible to forcibly achieve the aforementioned high-precision outer shape dimensions of the primary moulding 80. However, in this case, resin does not flow into the areas of the wound body 34 that are contacted and pressed by the above described primary mould, resulting in a thickness of the primary covering layer 100 of zero (or a value near thereto). Nevertheless, as described above, the secondary covering layer 200 having a predetermined thickness is subsequently uniformly formed across the entire outside area of the primary covering layer 100, thereby making it possible to reliably form the resin covering 35 in these areas as well.

As a result of the above, according to this embodiment, it is possible to suppress variance in thickness of the resin covering 35 when the wound body 34 is covered, improving uniformity. With this arrangement, there is no concern regarding insulation breakage such as the aforementioned case where the thickness of the resin covering 35 varies and is not uniform, making it possible to reliably improve the overall insulation properties.

Further, in particular, according to this embodiment, in the primary covering layer 100, the plurality of protrusion parts (the protrusion part 100a1, the protrusion part 100b1, the protrusion part 100c1, the protrusion part 100f1, and the protrusion part 100e1) are disposed on the outer surface on both sides along the stator circumferential direction (the outer surface part 100a), the outer surface on both sides along the stator radial direction (the outer surface part 100b), the outer surface on one side along the stator axial direction (outer surface part 100c), the outer surface on both sides along the stator circumferential direction on the inside of the coil hole 32 (the outer surface part 100f), and the outer surface on both sides along the stator axial direction on the inside of the coil hole 32 (the outer surface part 100e), protruded from each of the outer surface parts in an amount equivalent to predetermined dimensions. Then, the secondary covering layer 200 is disposed so as to cover the outside of the above described primary covering layer 100 at a thickness equal to the above described predetermined dimensions (the height-direction dimension of each of the protrusion parts).

That is, in this embodiment, each of the outer surface parts of the primary moulding 80 after the primary covering layer 100 is formed comprises the above described protrusion parts 100a1, 100b1, 100c1, 100e1, 100f1 having a predetermined dimension (equivalent to the thickness dimension of the secondary covering layer 200). With this arrangement, when the primary moulding 80 is housed in the secondary mould to form the secondary covering layer 200, it is possible to reliably support the entire primary moulding 80 with respect to the inner wall of the secondary mould by the above described protrusion parts 100a1, 100b1, 100c1, 100e1, 100f1, as described above.

Further, in particular, according to this embodiment, resin is poured and filled in the area around the primary moulding 80 supported by the above described protrusion parts 100a1, 100b1, 100c1, 100e1, 100f1, thereby causing the above described secondary covering layer 200 to cover the outside of the above described primary covering layer 100, excluding the above described plurality of protrusion parts, at a thickness equal to the above described predetermined dimension. With this arrangement, it is possible to reliably uniformly form the secondary covering layer 200 in the area around the primary moulding 80 housed in the secondary mould other than the protrusion parts 100a1, 100b1, 100c1, 100e1, 100f1.

Embodiment 3

Embodiment 3 will now be described using FIG. 20 and FIG. 21. This embodiment is an embodiment of a rotating electrical machine comprising a stator core that differs in shape from the above described embodiment 1. The components that are the same as those in the above described embodiment 1 will be denoted using the same reference numerals, and descriptions thereof will be suitably omitted or simplified.

As shown in FIG. 20 and FIG. 21, a rotating electrical machine 1A in this embodiment comprises a rotor 2A and a stator 3A. The rotor 2A comprises a cylindrical permanent magnet 18 mounted to the shaft 10 in the axial direction. The stator 3A comprises one stator core 25 and the plurality of (nine in this example) coils 30.

The stator core 25 is configured as an integrated type, unlike that in the above described embodiment 1. The stator core 25 comprises a substantially cylindrical cylinder part 25a positioned on the radial-direction outside of the permanent magnet 18 of the above described rotor 2A, a plurality of (nine in this example) teeth 25b radially protruded from this cylinder part 25a to the radial-direction outside, disposed at an equal interval in the circumferential direction, and a slot 36 that opens outwardly in the radial direction, arranged in a plurality (nine in this example) in the circumferential direction so as to be positioned between the adjacent teeth 25b, 25b of the nine teeth 25b.

Then, correspondingly to the above, the plurality of (nine in this example) coils 30 is inserted and housed in the above described plurality of slots 36. Specifically, one coil 30 is housed in the slots 36, 36 on both sides of one tooth 25b while wound around the tooth 25b so as to be housed in substantially one half of the area of each of the slots 36 along the circumferential direction on the tooth 25b side. In other words, the above described cylinder part 25a is arranged so that the base parts of the plurality of teeth 25b are each connected in the circumferential direction on the radial-direction inside of the plurality of coils 30 respectively wound on the teeth 25b while inserted into the slots in a plurality of circumferential direction locations.

Note that the encoder 12 is disposed further on the counter-load side (the left side in FIG. 20) than the cylindrical frame 5, and covered and housed by an encoder cover 17 disposed further on the counter-load side than the counter-load side bracket 8.

The configuration other than the above is generally the same as that of the rotating electrical machine 1 in embodiment 1, and descriptions thereof will be omitted.

In the rotating electrical machine 1A in this embodiment, the same advantages as those in the above described embodiment 1 are achieved. That is, the pressure-moulded coil 30 is used so that the wound body 34 configured by winding the conductor 31 covered by the insulating film 33 of predetermined resin (equivalent to the first resin) matches the shape of the slot 36 disposed in the stator core 25 of the stator 3A. Then, the surface of the above described pressure-moulded wound body 34 is completely covered using the resin 53 (equivalent to the second resin) that differs from the above described resin.

With this arrangement, similar to the above described embodiment 1, a bobbin for winding and insulating the conductor 31 is no longer needed, making it possible to use a conductor with a larger diameter than prior art. Further, the space factor of the coil 30 inside the slot 36 can be improved. As a result, the output of the rotating electrical machine 1A can be increased.

Further, while the above has described illustrative scenarios in which the rotating electrical machines 1, 1A are configured with a field system as the rotors 2, 2A and an armature as the stators 3, 3A, the rotating electrical machine may be configured with an armature as the rotor and a field system as the stator.

Further, other than that already stated above, techniques based on the above described embodiments and each of the modifications may be suitably utilized in combination as well.

Although other examples are not individually described herein, various changes can be made to the above described embodiments and modifications without deviating from the spirit and scope of the present disclosure.

What is claimed is:

1. A rotating electrical machine comprising:
a rotor comprising a rotating shaft;
brackets that rotatably support the rotating shaft; and
a substantially cylindrical stator that is fixed to the brackets and is provided so as to enclose an outer circumference side of the rotor; the stator comprising:
a stator core in which a plurality of slots is arranged in a circumferential direction; and
a plurality of coils inserted into the plurality of slots, each of the coils comprising:
a wound body that is configured by winding a conductor, and is pressure-moulded so that an outer shape of the wound body matches a shape of the corresponding slot; and
a resin covering that covers a surface of the wound body, the resin covering comprising:
a primary covering layer provided so as to cover an outside of the wound body, the primary covering layer being made of a resin; and
a secondary covering layer provided as to cover an outside of the primary covering layer, the secondary covering layer being made of a resin that is the same as the resin of the primary covering layer.

2. The rotating electrical machine according to claim 1, wherein
the primary covering layer comprises:
an outer surface comprising a plurality of surfaces including at least one of a curved surface and a flat surface; and
a plurality of protrusion parts protruded from the outer surface in an amount equivalent to a predetermined dimension;
the secondary covering layer is provided so as to cover an outside of the primary covering layer at a thickness equal to the predetermined dimension.

3. The rotating electrical machine according to claim 2, wherein
the secondary covering layer covers an outside of the primary covering layer, excluding the plurality of protrusion parts, at a thickness equal to the predetermined dimension.

4. A rotating electrical machine comprising:
a rotor comprising a rotating shaft;
brackets that rotatably support the rotating shaft; and
a substantially cylindrical stator that is fixed to the brackets and is provided so as to enclose an outer circumference side of the rotor; the stator comprising:
a stator core in which a plurality of slots is arranged in a circumferential direction; and
a plurality of coils inserted into the plurality of slots, each of the coils comprising:
a wound body that is configured by winding a conductor, and is pressure-moulded so that an outer shape of the wound body matches a shape of the corresponding slot;
an insulating film that covers an outer peripheral surface of the conductor, the insulating film being made of a first resin;
a resin covering that covers an outside of the insulating film on the conductor that defines the outer shape of the wound body, the resin covering being made of a second resin that differs from the first resin,
wherein an outer shape of the resin covering comprises:
a first surface that is made of a partially cylindrical surface, and is positioned on one side along a first direction orthogonal to a revolving direction of the conductor;
a second surface that is made of a partially cylindrical surface, and is positioned on the other side along the first direction;
a third surface that is made of a partially conical surface, and is provided on one side of the first surface and the second surface along a second direction orthogonal to the first direction; and
a fourth surface that is made of a flat surface, and is provided on the other side of the first surface and the second surface along the second direction.

5. The rotating electrical machine according to claim 4, wherein
the outer shape of the resin covering further comprises:
a fifth surface that is made of a flat surface, and is correspondingly provided on one side along a third direction orthogonal to the first direction and the second direction;
a sixth surface that is made of a flat surface, and is correspondingly provided on the other side along the third direction;
a first corner part that connects the third surface and the fifth surface; and
a second corner part that connects the third surface and the sixth surface;
the first corner part and the second corner part being respectively configured so as to closely contact with the other adjacent coil without an air gap produced, when the plurality of coils is adjacently disposed in the plurality of the slots.

6. The rotating electrical machine according to claim 4, further comprising:
a winding start part and a winding end part of the conductor to be wound, that are protruded to the other side of the wound body along the second direction, wherein
the conductor of the wound body is, in sections other than the portions that are on the other side along the second direction and includes the winding start part and the winding end part of the conductor, wound by means of an aligned winding.

7. A rotating electrical machine comprising:
a rotor comprising a rotating shaft;
brackets that rotatably support the rotating shaft; and
a substantially cylindrical stator that is fixed to the brackets and is provided so as to enclose an outer circumference side of the rotor; the stator comprising:
a stator core in which a plurality of slots is arranged in a circumferential direction; and
a plurality of coils inserted into the plurality of slots, each of the coils comprising:
a wound body that is configured by winding a conductor, and is pressure-moulded so that an outer shape of the wound body matches a shape of the corresponding slot;
an insulating film that covers an outer peripheral surface of the conductor, the insulating film being made of a first resin; and
a resin covering that covers an outside of the insulating film on the conductor that defines the outer shape of the wound body, the resin covering being made of a second resin that differs from the first resin,
wherein the resin covering comprises a depression part that is formed by at least one support part configured to support the wound body during a covering processing of a surface of the wound body, is opened to the outside at one end of the depression part, and leads to a surface of the wound body at the other end of the depression part.

8. A rotating electrical machine comprising:
a rotor comprising a rotating shaft;
brackets that rotatably support the rotating shaft; and
a substantially cylindrical stator that is fixed to the brackets and is provided so as to enclose an outer circumference side of the rotor; the stator comprising:
a stator core in which a plurality of slots is arranged in a circumferential direction; and
a plurality of coils inserted into the plurality of slots, each of the coils comprising:
a wound body that is configured by winding a conductor, and is pressure-moulded so that an outer shape of the wound body matches a shape of the corresponding slot;
an insulating film that covers an outer peripheral surface of the conductor, the insulating film being made of a first resin; and
a resin covering that covers an outside of the insulating film on the conductor that defines the outer shape of the wound body, the resin covering being made of a second resin that differs from the first resin,
wherein the resin covering comprises:
a first covering part formed by a first covering processing for covering a part of a surface of the wound body; and
a second covering part formed by a second covering processing for covering a remaining section of the surface of the wound body, the remaining section having not been subjected to the first covering processing.

* * * * *